(12) United States Patent
Bleyer et al.

(10) Patent No.: US 10,776,954 B2
(45) Date of Patent: Sep. 15, 2020

(54) REAL-WORLD ANCHOR IN A VIRTUAL-REALITY ENVIRONMENT

(71) Applicant: MICROSOFT TECHNOLOGY LICENSING, LLC, Redmond, WA (US)

(72) Inventors: Michael Bleyer, Seattle, WA (US); Yuri Pekelny, Seattle, WA (US); Raymond Kirk Price, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 92 days.

(21) Appl. No.: 16/210,952

(22) Filed: Dec. 5, 2018

(65) Prior Publication Data

US 2020/0111232 A1    Apr. 9, 2020

Related U.S. Application Data

(63) Continuation-in-part of application No. 16/154,260, filed on Oct. 8, 2018.

(51) Int. Cl.
*G06K 9/00* (2006.01)
*G06T 7/80* (2017.01)
(Continued)

(52) U.S. Cl.
CPC .............. *G06T 7/80* (2017.01); *G06F 3/012* (2013.01); *G06K 9/00664* (2013.01);
(Continued)

(58) Field of Classification Search
None
See application file for complete search history.

(56) References Cited

U.S. PATENT DOCUMENTS 8,731,301 B1    5/2014    Bushman et al.
9,129,430 B2    9/2015    Salter et al.
(Continued)

FOREIGN PATENT DOCUMENTS

EP    3159829 A1    4/2017
EP    3330926 A1    6/2018
(Continued)

OTHER PUBLICATIONS

Metz, Rachael, "How to Avoid Real Objects While in a Virtual World", Retrieved From: https://www.technologyreview.com/s/538336/how-to-avoid-real-objects-while-in-a-virtual-world/, Jun. 12, 2015, 8 Pages.

(Continued)

*Primary Examiner* — Atiba O Fitzpatrick
(74) *Attorney, Agent, or Firm* — Workman Nydegger

(57) ABSTRACT

A head-mounted device ("HMD") is configured to perform intrinsic and/or extrinsic calibration of the HMD's camera system by exploiting a displayed electronic image rendered on a separate display screen. A series of images are captured using one or more of the HMD's cameras. The displayed image is a known image that includes markers with known characteristics to the HMD. The known characteristics include known marker shapes and a number of coded or un-coded markers. Each image in the series captures the displayed image at a different angle or distance relative to another image in the series. The HMD then identifies, from within the series of images, two-dimensional image positions of the markers. The HMD uses the two-dimensional image positions and a determined three-dimensional position of the markers to perform a bundle adjustment used to subsequently determine a position and angular alignment of the separate display screen relative to the HMD.

20 Claims, 22 Drawing Sheets

(51) Int. Cl.
*G06T 7/564* (2017.01)
*G06T 7/70* (2017.01)
*G06F 3/01* (2006.01)
*H04N 5/235* (2006.01)
*H04N 17/00* (2006.01)
*H04L 29/06* (2006.01)

(52) U.S. Cl.
CPC ............... *G06T 7/564* (2017.01); *G06T 7/70* (2017.01); *H04N 5/2354* (2013.01); *H04N 17/002* (2013.01); *G06T 2207/30204* (2013.01); *G06T 2207/30244* (2013.01); *H04L 67/38* (2013.01)

(56) References Cited

U.S. PATENT DOCUMENTS

| | | |
|---|---|---|
| 9,561,019 B2 | 2/2017 | Mihailescu et al. |
| 9,599,818 B2 | 3/2017 | Yamagishi et al. |
| 9,865,089 B2 | 1/2018 | Burns et al. |
| 2011/0304646 A1 | 12/2011 | Kato |
| 2015/0145887 A1 | 5/2015 | Forutanpour et al. |
| 2015/0170419 A1 | 6/2015 | Ohashi |
| 2016/0026253 A1 | 1/2016 | Bradski et al. |
| 2016/0124502 A1 | 5/2016 | Sawyer et al. |
| 2016/0147492 A1 | 5/2016 | Fugate et al. |
| 2016/0379413 A1 | 12/2016 | Yamamoto et al. |
| 2017/0025088 A1 | 1/2017 | Alon et al. |
| 2017/0053440 A1 | 2/2017 | Yoon et al. |
| 2017/0084051 A1 | 3/2017 | Weising et al. |
| 2017/0115488 A1 | 4/2017 | Ambrus et al. |
| 2017/0180489 A1 | 6/2017 | Oh et al. |
| 2017/0201808 A1 | 7/2017 | Chowdhary et al. |
| 2017/0287218 A1 | 10/2017 | Nuernberger et al. |
| 2017/0295360 A1 | 10/2017 | Fu |
| 2017/0344124 A1 | 11/2017 | Douxchamps et al. |
| 2018/0089901 A1 | 3/2018 | Rober et al. |
| 2018/0218538 A1 | 8/2018 | Short et al. |
| 2018/0300952 A1 | 10/2018 | Evans et al. |
| 2018/0308248 A1 | 10/2018 | Hubert et al. |
| 2019/0089456 A1 | 3/2019 | Kasilya Sudarsan et al. |
| 2019/0213754 A1 | 7/2019 | Lee et al. |
| 2020/0111256 A1 | 4/2020 | Bleyer et al. |

FOREIGN PATENT DOCUMENTS

| | | |
|---|---|---|
| WO | 2018063896 A1 | 4/2018 |
| WO | 2018099989 A1 | 6/2018 |

OTHER PUBLICATIONS

Sra, et al., "Bringing real objects, spaces, actions, and interactions into social VR", In Proceedings of IEEE Third VR International Workshop on Collaborative Virtual Environments, Mar. 1, 2016, 2 Pages.

Trentini, Yisela Alvarez, "Designing experiences for Virtual Reality: Lessons from the physical world", Retrieved From: https://blog.prototypr.io/designing-experiences-for-virtual-reality-lessons-from-the-physical-world-23c942741894, Jun. 6, 2017, 11 Pages.

"Non Final Office Action Issued in U.S. Appl. No. 16/154,260", dated May 30, 2019, 42 Pages.

"Non Final Office Action Issued in U.S. Appl. No. 16/154,260", dated Feb. 5, 2020, 63 Pages.

"Final Office Action Issued in U.S. Appl. No. 16/154,260", dated Oct. 10, 2019, 57 Pages.

Bork, et al., "Towards Efficient Visual Guidance in Limited Field-of-View Head-Mounted Displays", In Journal of IEEE Transactions on Visualization and Computer Graphics, vol. 24, Issue 11, Sep. 6, 2018, pp. 2983-2992.

"International Search Report and Written Opinion Issued in PCT Application No. PCT/US2019/044004", dated Dec. 13, 2019, 20 Pages.

"International Search Report and Written Opinion Issued in PCT Application No. PCT/US2019/044006", dated Jan. 14, 2020, 18 Pages.

Pears, et al., "Smart Phone Interaction with Registered Displays", In Journal of IEEE Pervasive Computing, vol. 8, Issue 2, Apr. 17, 2009, pp. 14-21.

Scherfgen, David, "Camera-Based 3D Pointing Approach Using Dynamic On-Screen Markers", In Master's Thesis Submitted to Bonn-Rhein-Sieg University of Applied Sciences, Apr. 15, 2014, 145 Pages.

Whitton, et al., "Integrating Real and Virtual Objects in Virtual Environments", Retrieved from: http://web.archive.org/web/20070824035829/http://www.cs.unc.edu/~whitton/ExtendedCV/Papers/2005-HCII-Whitton-MixedEnvs.pdf, Aug. 24, 2007, 10 Pages.

REAL-WORLD ANCHOR IN A VIRTUAL-REALITY ENVIRONMENT

CROSS-REFERENCE TO RELATED APPLICATIONS

This application is a continuation-in-part of U.S. patent application Ser. No. 16/154,260 filed on Oct. 8, 2018, entitled "REAL-WORLD ANCHOR IN A VIRTUAL-REALITY ENVIRONMENT," which is now abandoned, but the entirety of which is incorporated herein by reference.

BACKGROUND

Virtual-reality (VR) systems have received significant attention because of their ability to create truly unique experiences for their users. For reference, conventional VR systems create a completely immersive experience by restricting their users' views to only VR environments/scenes.

A VR environment is typically presented to a user through a head-mounted device (HMD), which completely blocks any view of the real world. In contrast, conventional augmented-reality (AR) systems create an AR experience by visually presenting virtual images that are placed in or that interact with the real world. As used herein, the terms "virtual image" and "virtual object" may be used interchangeably and are used to collectively refer to any image rendered within a VR environment/scene.

Some VR systems also utilize one or more on-body devices (including the HMD), a handheld device, and other peripherals. The HMD provides a display that enables a user to view overlapping and/or integrated visual information (i.e. virtual images) within the VR environment. The user can often interact with virtual objects in the VR environment by using one or more peripherals and sometimes even their own body.

Continued advances in hardware capabilities and rendering technologies have greatly improved how VR systems render virtual objects. In fact, the rendering technology of VR systems has improved so much that users often forget they are still physically located in the real world. One negative result of providing such an immersive experience is that users can become disoriented, relative to the real-world, and can lose their balance and/or collide with objects in real-world while engaging with the VR environment/scene.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments relate to computer systems, methods, and devices (e.g., HMDs) that perform intrinsic and/or extrinsic calibration of an HMD's camera system by exploiting a displayed electronic image that is being rendered on a display screen of a separate computer system.

In some embodiments, the HMD captures a series of images of the displayed electronic image using the HMD's cameras. This displayed image is a known image that includes markers with known characteristics. As an example, the known characteristics may include known marker shapes and a number of coded (e.g., a QR code or bar code) or un-coded markers. Each image in the series captures the displayed electronic image at a different angle or distance relative to another image in the series. The HMD then identifies the two-dimensional image positions of the markers from within the series of images. Additionally, the HMD uses the two-dimensional image positions and the markers' three-dimensional positions relative to the environment to perform a bundle adjustment used to subsequently determine the specific positional distance and angular alignment between the HMD and the separate display screen. In this regard, the HMD is able to determine intrinsic parameters (e.g., the camera's optical center and focal length) and/or extrinsic parameters (e.g., the location of the camera relative to the environment).

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
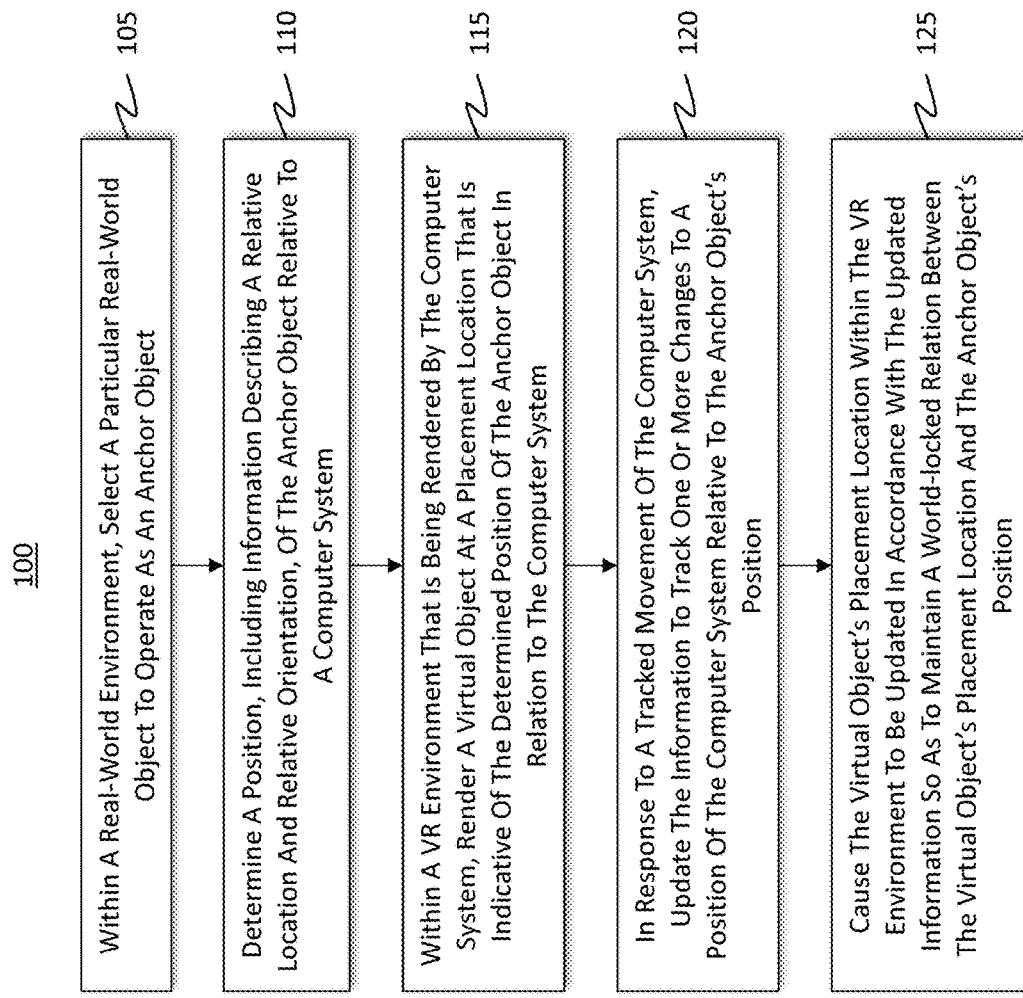
FIG. 1 illustrates a flowchart of an example method for displaying, within a VR environment, a virtual anchor object corresponding to a real-world anchor object.

Disclosed embodiments relate to computer systems, methods, and devices (e.g., HMDs) that perform intrinsic and/or extrinsic calibration of an HMD's camera system. To do so, the HMD captures a series of images of the displayed electronic image. The displayed image is a known image that includes markers with known characteristics. The HMD then identifies two-dimensional and three-dimensional characteristics of those markers relative to each other and relative to the surrounding environment. Using those characteristics, the HMD performs a bundle adjustment used to subsequently determine the specific positional distance and angular alignment between the HMD and the screen displaying the electronic image.

In some embodiments, a real-world object is selected to operate as an anchor object. Once the anchor object is selected, then a corresponding virtual anchor object is rendered within the VR environment. This corresponding virtual anchor object is world-locked within the VR environment relative to the anchor object's real-world location. Therefore, regardless of how the HMD moves or the VR environment changes, the corresponding virtual anchor object is projected within the VR environment at a location indicative/reflective of the anchor object's real-world location. As such, the user of the HMD can remain cognizant of his/her real-world environment (even when immersed in the VR environment) by remaining aware of the location of the anchor object. This cognizance helps the user avoid colliding with real-world objects.

In some embodiments, a display screen (e.g., a computer screen, smartphone screen, television ("TV") screen, gaming console screen, etc.) is selected to operate as a real-world anchor object. In this case, an HMD issues an instruction to the computer system controlling the display screen to cause the display screen to display one or more known images (e.g., a calibration marker image, a buffered video recording, etc.). Once the known image(s) is displayed, the HMD captures/records an image of the displayed known image(s) as the known image(s) is being displayed on the display screen, and the HMD determines certain attributes of the known image(s). These attributes are then used to generate information describing the positional relationship between the display screen and the HMD. Additionally, a virtual anchor object corresponding to the display screen is rendered within a VR environment projected by the HMD. In response to movements of the HMD, the virtual anchor object's location within the VR environment is updated so as to reflect the positional relationship between the HMD and the display screen.

By performing these and other operations, the disclosed embodiments are able to significantly improve the user's experience. For instance, one of the primary allures of VR headsets is that they provide a truly immersive experience. There is a price that comes with being fully immersed in the virtual world, however, because the user is blind to the real world. It has been shown that as users interact with VR environments, users often collide with real-world objects. These collisions abruptly break the users' VR immersion experiences. The disclosed embodiments provide technical solutions to these technical problems, as well as others, by providing a virtual anchor object (within the VR environment) associated with a static, or rather fixed, real-world anchor object. Using this virtual anchor object, the user is able to extrapolate the position of real-world obstacles (e.g., walls, fixtures, furniture, etc.) in his/her mind and then avoid those obstacles while engaging with the VR environment. Consequently, the user's VR experience may not be abruptly interrupted.

The disclosed calibration methods (e.g., disclosed in reference to FIG. 16D), also facilitate the manner in which the anchor is presented with the proper positioning within the VR environment (e.g., with the proper orientation, distance, size and angular alignment).

Example Method(s)

Attention will now be directed to FIG. 1 which refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed. The method presented in FIG. 1 is provided to introduce the disclosed embodiments while subsequent portions of the disclosure will more fully clarify different aspects of the disclosed embodiments.

FIG. 1 illustrates a flowchart of an example method 100 for providing, within a VR environment, a virtual anchor object corresponding to a real-world anchor object. Initially, method 100 includes an act 105 of selecting a particular real-world object located within a real-world environment (as opposed to a VR environment) to operate as an anchor object. Determining which real-world object will operate as the anchor object is based on one or more detected attributes of the real-world object.

Figure 2:
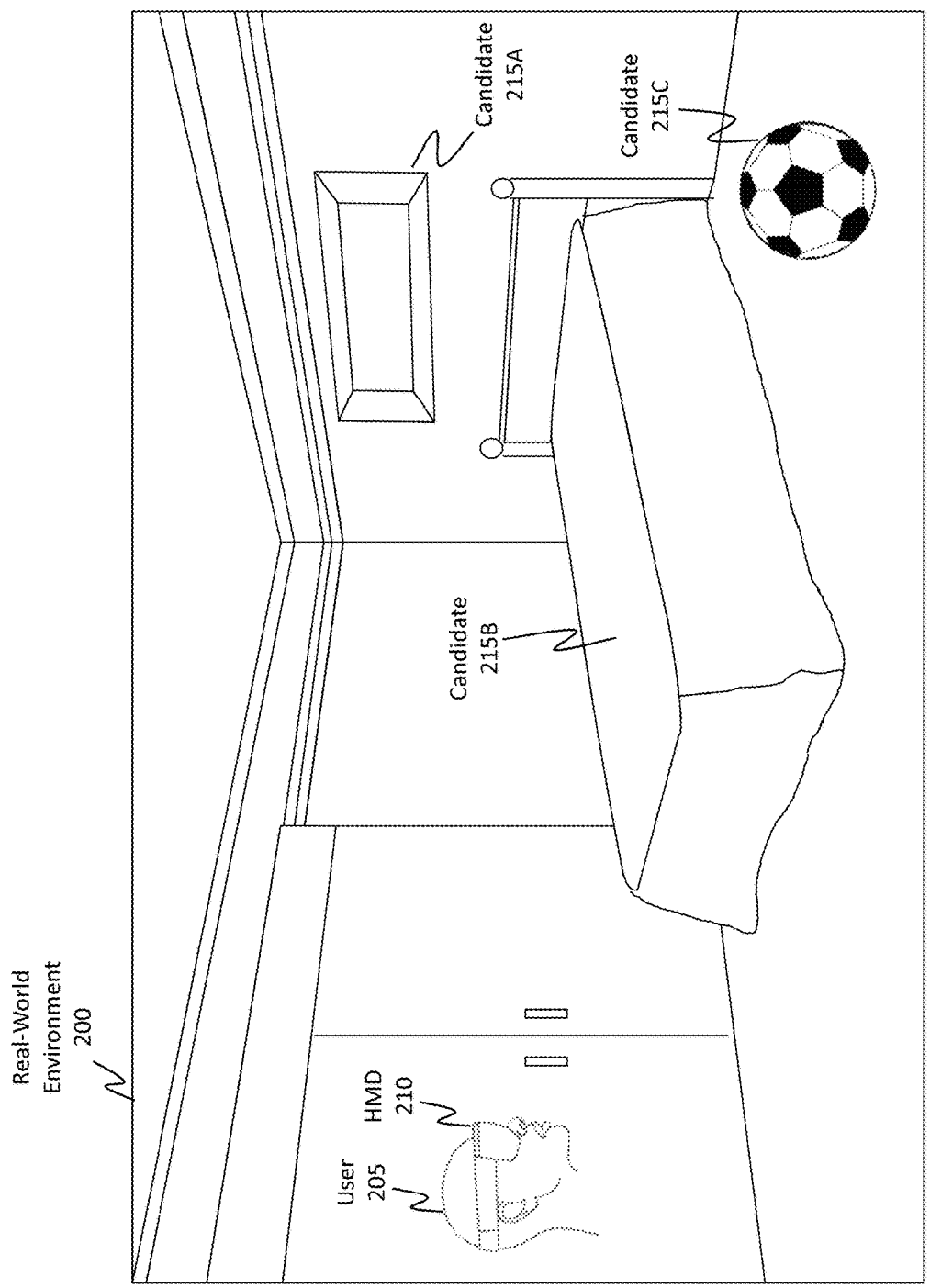
FIG. 2 illustrates an example real-world environment with a number of candidate anchor objects.

For example, FIG. 2 shows a real-world environment 200 in which a user 205 is located. User 205 is currently using HMD 210. Within real-world environment 200, there may be any number of candidate anchor objects, such as, for example, candidate 215A, candidate 215B, and candidate 215C. The HMD 210 is able to use any number of cameras to scan the real-world environment 200 and to classify/segment objects from one another. As a part of this segmentation process, HMD 210 is able to identify certain attributes of those objects. Take, for example, candidate 215A (i.e. the picture frame). HMD 210 is able to determine that candidate 215A has a high probability of being a very stationary, static, or fixed object because it is a picture frame mounted on the wall (e.g., HMD 210 is able to determine that such objects typically do not move). Because the detected attributes of candidate 215A (i.e. it being a picture frame, it being mounted to the wall, etc.) highly suggest that candidate 215A is unlikely to move, HMD 210 will regard candidate 215A as being a good candidate to operate as an anchor object.

Candidate 215B, on the other hand, may be identified as being only a moderately acceptable candidate. More specifically, candidate 215B is a bed with a bedspread. Here, HMD 210 may determine that because bedspreads sometimes move (e.g., as a result of a person sitting on the bed), the bed (including the bedspread) may be identified by HMD 210 as being only moderately acceptable to act as an anchor object.

Candidate 215C, however, may be identified as being a poor candidate. More specifically, candidate 215C is a soccer ball. HMD 210 may determine that the soccer ball is highly unlikely to remain stationary in one location for a prolonged period of time. Based on analyzing the type and determined characteristics/attributes of candidate 215C, HMD 210 may categorize candidate 215C as being a poor candidate. It will be appreciated that this analysis may be performed by a separate computer system, such as, for example a computer or service running in a cloud environment.

Figure 3:
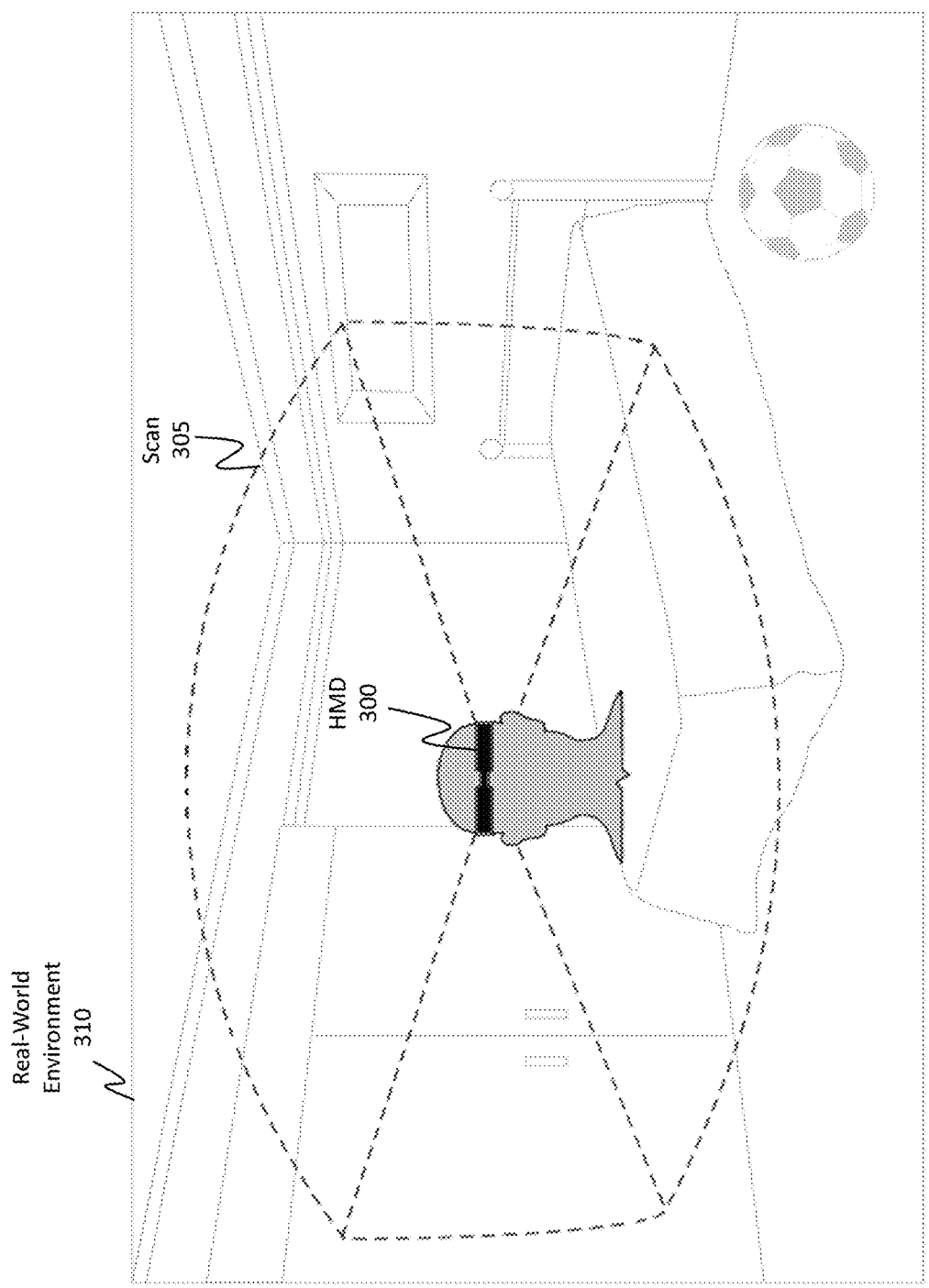
FIG. 3 illustrates how a HMD is able to scan a real-world environment to identify any number of candidate anchor objects.

FIG. 3 shows an example scenario in which HMD 300 is performing a scanning operation 305 on the real-world environment 310. Here, HMD 300 is representative of HMD 210 from FIG. 2, and the real-world environment 310 is representative of the real-world environment 200. From this, it will be appreciated that the disclosed embodiments are able to scan the real-world environment 310 to detect real-world objects. Once detected, the embodiments are able to analyze and characterize/segment those objects based on their detected attributes. In some instances, a machine learning algorithm may be used to characterize/segment objects. Additionally, classification information obtained from the Internet or some other data repository may be used to better gauge the attributes of the real-world objects within the real-world environment 310. Based on these characterizations, the embodiments are then able to classify objects as being good candidates, moderately acceptable candidates, or poor candidates (or some other classification scheme). Grouping objects into different candidate tiers may be based on how stable a particular object is determined to be. That is, it is beneficial to select objects (e.g., to act as the anchor object) whose determined stability attributes satisfy at least a threshold level of stability. Different thresholds may be used for the different tiers (e.g., good, moderate, and poor).

As demonstrated above, in some embodiments, the process of selecting a particular real-world object to operate as the anchor object may initially include identifying multiple real-world objects from within the real-world environment. Each of these real-world objects may then be classified based on a designated criteria (e.g., a stability criteria). Thereafter, the embodiments may select one (or more) real-world objects to operate as the anchor object based on a determination that the designated criteria (e.g., the stability criteria) of the selected real-world object adequately satisfies a pre-established criteria threshold (e.g., a stability threshold). This selection may occur automatically by the HMD or, alternatively, it may occur in response to user input. For instance, the user may be presented with any number of selectable candidate anchor objects. From this, the user can select one (or more) of those candidate anchor objects to actually operate as the anchor object.

Figure 4:
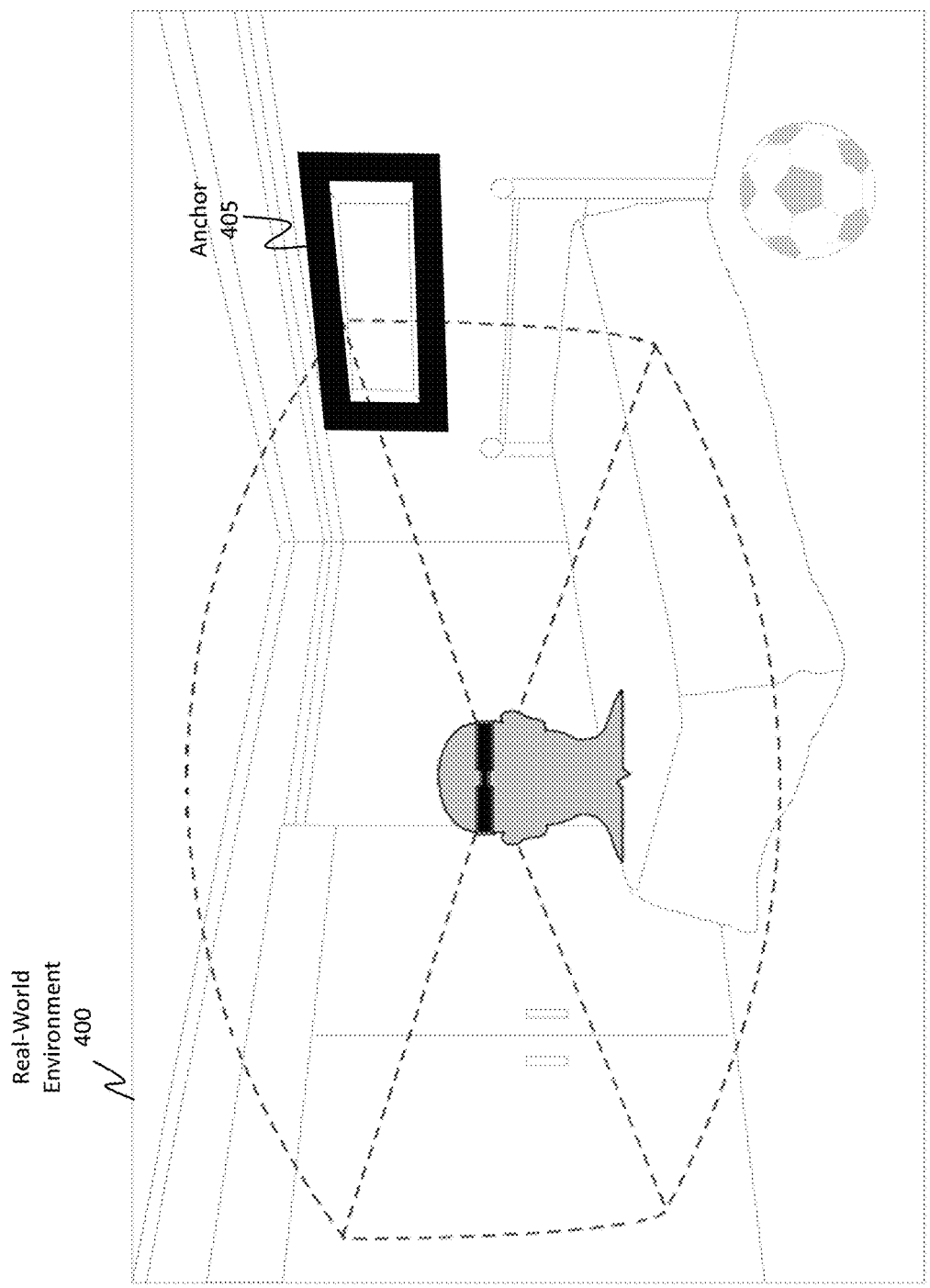
FIG. 4 illustrates how an anchor object may be selected within the real-world to act as a visual cue or reference within a VR environment.

Returning to FIG. 1, in act 110, a position and orientation of the anchor object relative to the computer system is determined. FIG. 4, for example, shows a real-world environment 400, which is representative of the real-world environments from FIGS. 2 and 3, as well as an indication regarding the selection of a particular anchor 405 (i.e. the picture frame). In the scenario presented in FIG. 4, the HMD is able to determine its position and orientation relative to anchor 405. Determining position and orientation will be discussed in more detail in connection with FIGS. 13 through 17. Very briefly, however, it will be appreciated that the position and orientation information may include any one or more of location/position information, depth information, angular alignment information, perspective information, and/or orientation information.

Returning to FIG. 1, in act 115, a particular virtual anchor object is also rendered within a VR environment, which is being rendered by the computer system (e.g., the HMD). This virtual anchor object is rendered at a placement location in the VR environment indicative/reflective of the determined position and orientation of the anchor object relative to the computer system. For example, the virtual anchor object is rendered as having a depth, perspective, angular alignment (e.g., corresponding pitch, yaw, and roll), obliqueness, and orientation (e.g., both vertical and horizontal) representative of the real-world anchor object's depth, angular alignment, obliqueness, perspective, and orientation relative to the HMD. Such features are discussed in more detail later in connection with FIGS. 16A-16D.

Figure 5:
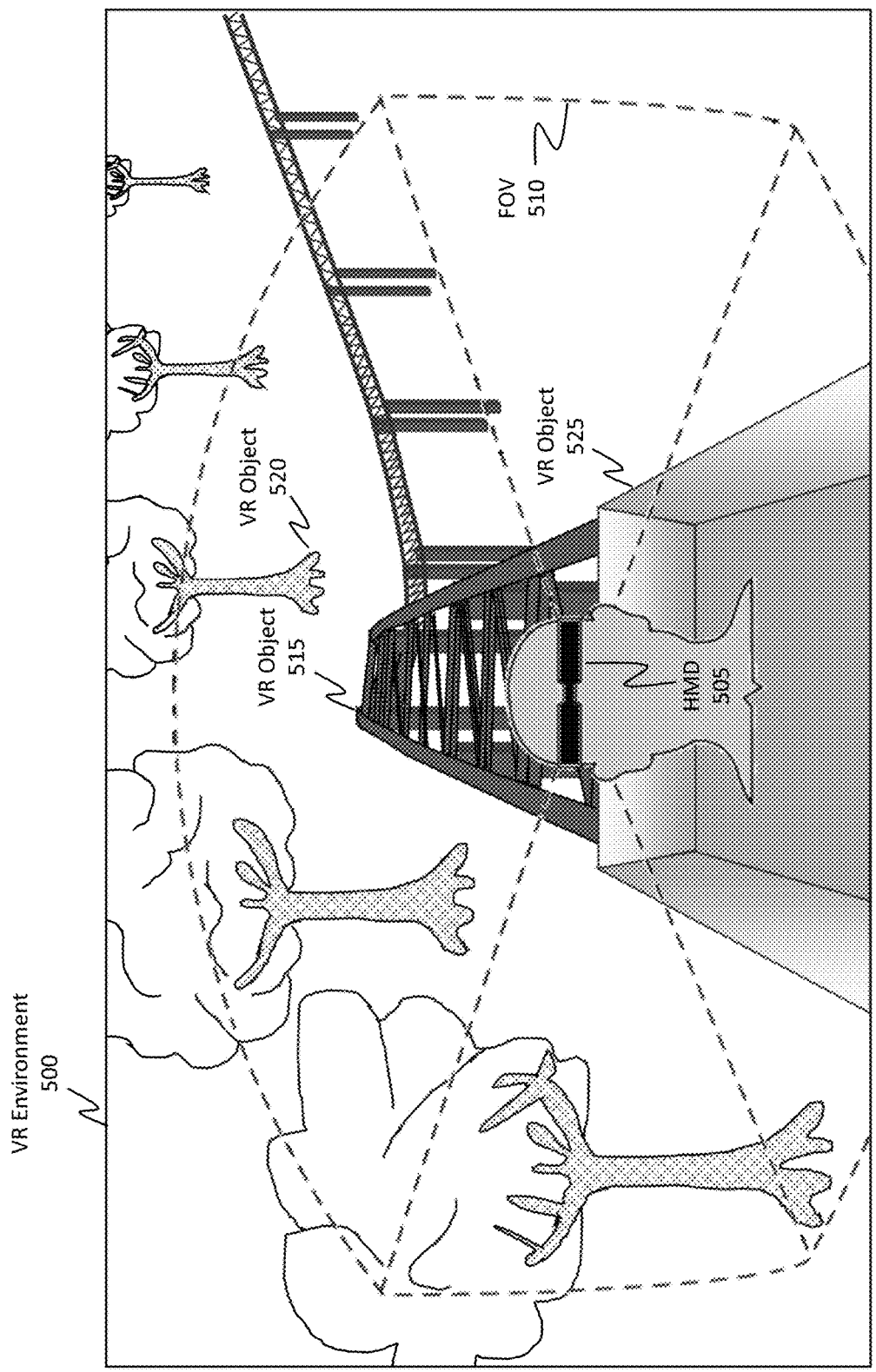
FIG. 5 illustrates an example of a VR environment, including the HMD's field of view ("FOV") of that VR environment.

Turning briefly to FIG. 5, here there is shown a VR environment 500 that is being rendered by the HMD 505 (e.g., the computer system in act 115 of FIG. 1). In this example scenario, VR environment 500 is representative of a rollercoaster experience where the user seems to be sitting in a rollercoaster as the rollercoaster travels along a set of tracks. In this regard, the VR environment 500 can be thought of as a non-stationary moving environment such that VR environment 500 appears to be moving relative to the user who is wearing the HMD, and where the VR environment 500 moves regardless of any movements of the user or HMD (i.e. even if the user sits perfectly still, it still seems that the environment is moving). In other embodiments, the VR environment 500 may be a stationary environment (e.g., a room) that does not move if the user remains still. For instance, if the VR environment 500 were a room, then the user could walk about the virtual room, but the virtual room would appear to be stationary. Accordingly, as will be demonstrated next, a virtual anchor object may be rendered in a locked position relative to the real-world environment as opposed to being locked relative to the VR environment (even a non-stationary VR environment) such that the virtual anchor object is fixedly displayed irrespective/independent of changes to the VR environment or even to movements of the HMD.

While the VR environment 500 may be very expansive, it will be appreciated that the user of the HMD 505 will be able to see only the content presented within HMD 505's field of view (FOV) 510. By repositioning/moving HMD 505, different portions of the VR environment 500 will be displayed in the FOV 510. As shown, VR environment 500 may include any number of virtual objects, such as, for example, VR object 515 (e.g., a rollercoaster track), VR object 520 (e.g., a tree), and VR object 525 (e.g., a rollercoaster train).

Figure 6:
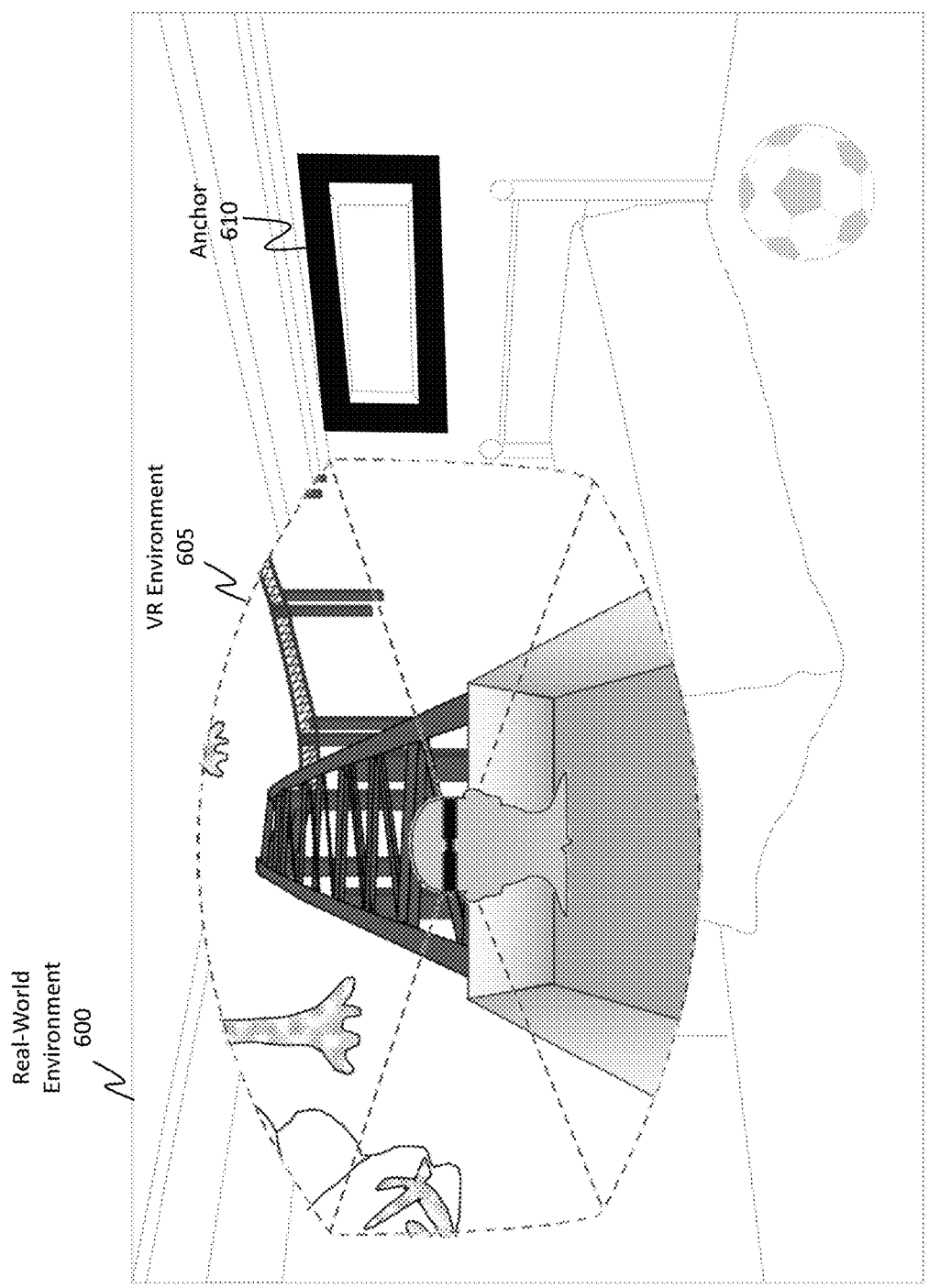
FIG. 6 illustrates how a real-world anchor object may be used to help a user engage with a VR environment while still enabling the user to remain aware/cognizant of the real-world objects (i.e. obstacles) that are present within the real-world environment but that are not visible because of the HMD.

FIG. 6 shows how, even though the user is physically located within the real-world environment 600, which is representative of the previously described real-world environments, the user may be engaged with the VR environment 605, which is representative of the previously described VR environments. Because the user may be moving while immersed in the VR environment 605, it is beneficial to remind the user that he/she is still in the real-world environment 600 and that the user should avoid colliding with real-world objects. Consequently, anchor 610 was selected to help the user remain cognizant of the real-world environment 600.

To do so, as described earlier in act 115 of FIG. 1, the disclosed embodiments render a particular virtual anchor object within the VR environment, where the virtual anchor object corresponds to the anchor object. Such a scenario is shown in FIG. 7.

Figure 7:
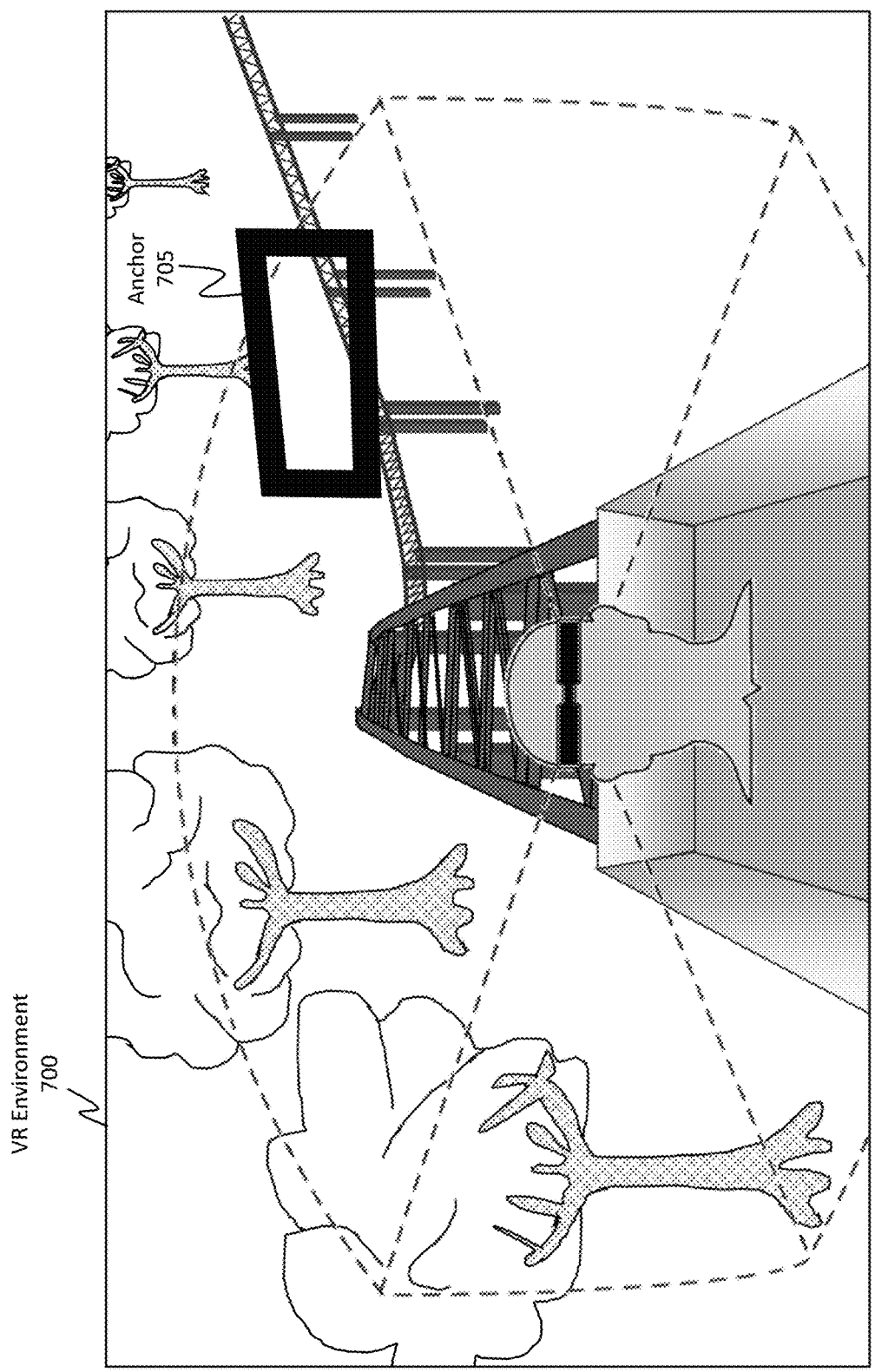
FIG. 7 illustrates how a virtual anchor object, which corresponds to the selected real-world anchor object, may be rendered within the VR environment to assist the user in remaining cognizant of his/her real-world environment.

More specifically, FIG. 7 shows a VR environment 700 and a rendered virtual anchor object (labeled as anchor 705) that corresponds to the anchor 610 from FIG. 6 and anchor 405 from FIG. 4. It will be appreciated that anchor 705 (corresponding to the picture frame) in FIG. 7 is rendered within VR environment 700 at a placement location reflective of the picture frame's actual real-world location and orientation. That is, regardless of how the HMD moves and regardless of the content displayed in the HMD's FOV, the anchor 705 is always rendered at a location within the VR environment 700 coinciding with the real-world anchor's position and orientation. Furthermore, anchor 705 is rendered in a manner to reflect the real-world anchor object's position, depth, orientation, angular alignment, obliqueness, and/or perspective relative to the HMD.

For example, returning to FIG. 1, in response to a tracked movement of the computer system, the information describing the relative location and relative orientation of the anchor object is updated (act 120). These updates are performed to track one or more changes of the computer system's position relative to the anchor object's position.

With these updates, the virtual anchor object's placement location within the VR environment is updated in accordance with the updated information (act 125 in FIG. 1). That is, the virtual anchor object's placement location is updated in order to reflect a world-locked relation between the virtual anchor object's placement location and the anchor object's position.

Figure 8:
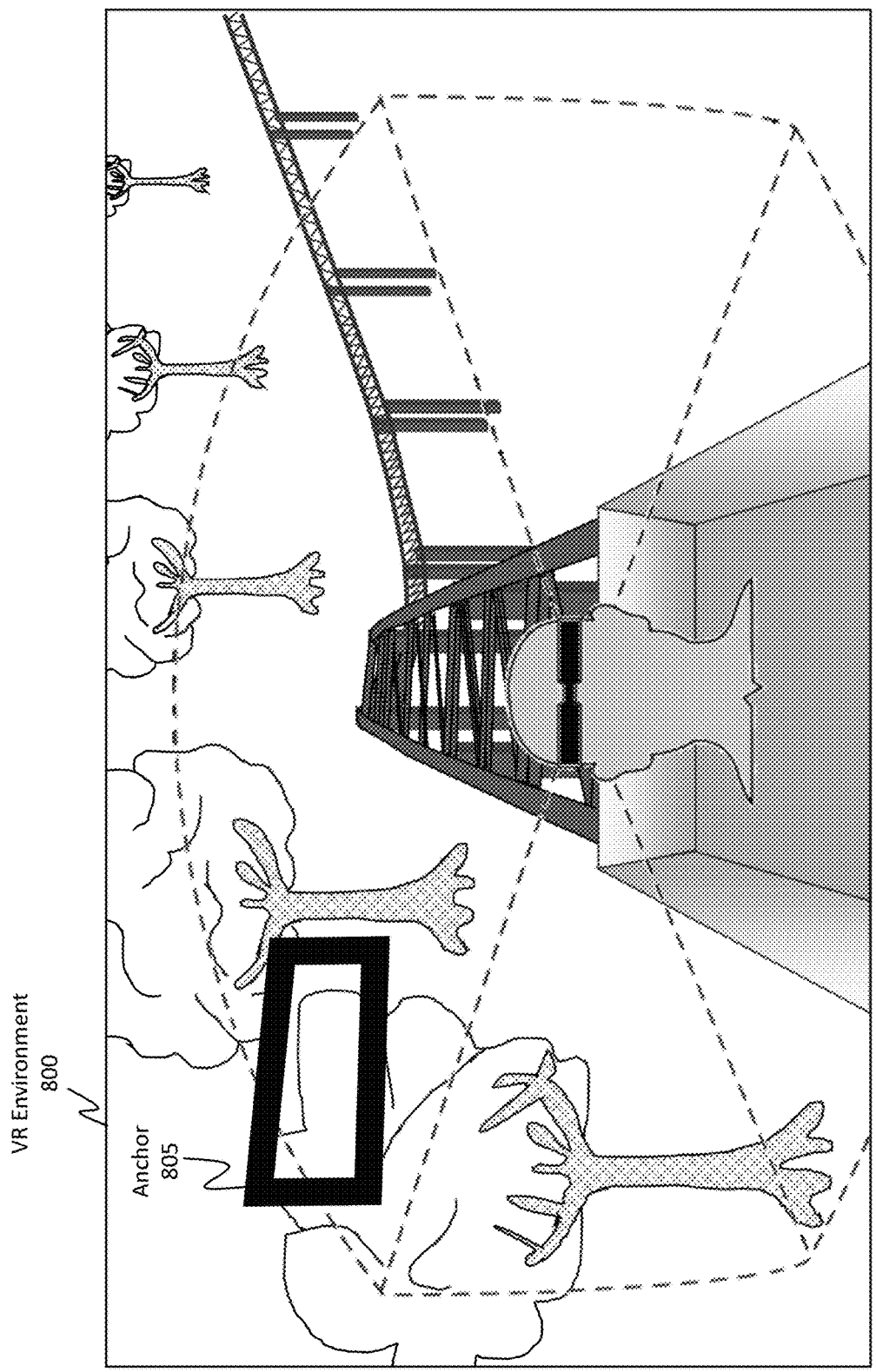
FIG. 8 illustrates how, regardless of where the HMD moves, the virtual anchor object remains world-locked relative to the real world as opposed to being world-locked relative to the VR environment.

FIGS. 7 and 8 more fully clarify this aspect. For instance, in FIG. 7, anchor 705 (corresponding to the picture frame) is displayed in the right-hand area of the HMD's FOV. In contrast, FIG. 8 shows a VR environment 800, which is representative of VR environment 700 from FIG. 7, and the same anchor 805. Here, however, anchor 805 is displayed on the left-hand area of the HMD's FOV. This change in placement location occurred as a result of the HMD shifting position relative to the picture frame. As an example, in the scenario presented in FIG. 7, the user of the HMD was physically positioned within the real-world environment so that the picture frame was within the user's right-hand peripheral view. Later, as shown by the scenario presented in FIG. 8, the user and HMD shifted position thereby causing the picture frame to now be located within the user's left-hand peripheral view. It will be appreciated that in some circumstances, the virtual objects in the VR environment 800 may also have changed based on the user's new position, but for simplicity sake, the same virtual objects as FIG. 7 are used in FIG. 8. In this manner, the VR environment was updated so that the virtual anchor object associated with the picture frame (i.e. anchor 705 and 805 from FIGS. 7 and 8, respectively) was rendered in location so as to maintain the world-locked relationship between the real-world as opposed to being world-locked relative to the VR environment.

Accordingly, the disclosed embodiments beneficially provide a virtual anchor object within a VR environment, where the virtual anchor object is rendered within the VR environment at a location that always corresponds to the real-world anchor object. This rendering of the virtual anchor object helps the user remain aware of his/her real-world physical environment. By maintaining this awareness, the user will be able to intuitively recall where real-world obstacles (e.g., furniture, fixtures, walls, etc.) are located and can avoid those obstacles, even when immersed in a VR environment.

Modifying the Virtual Anchor Object

Figure 9:
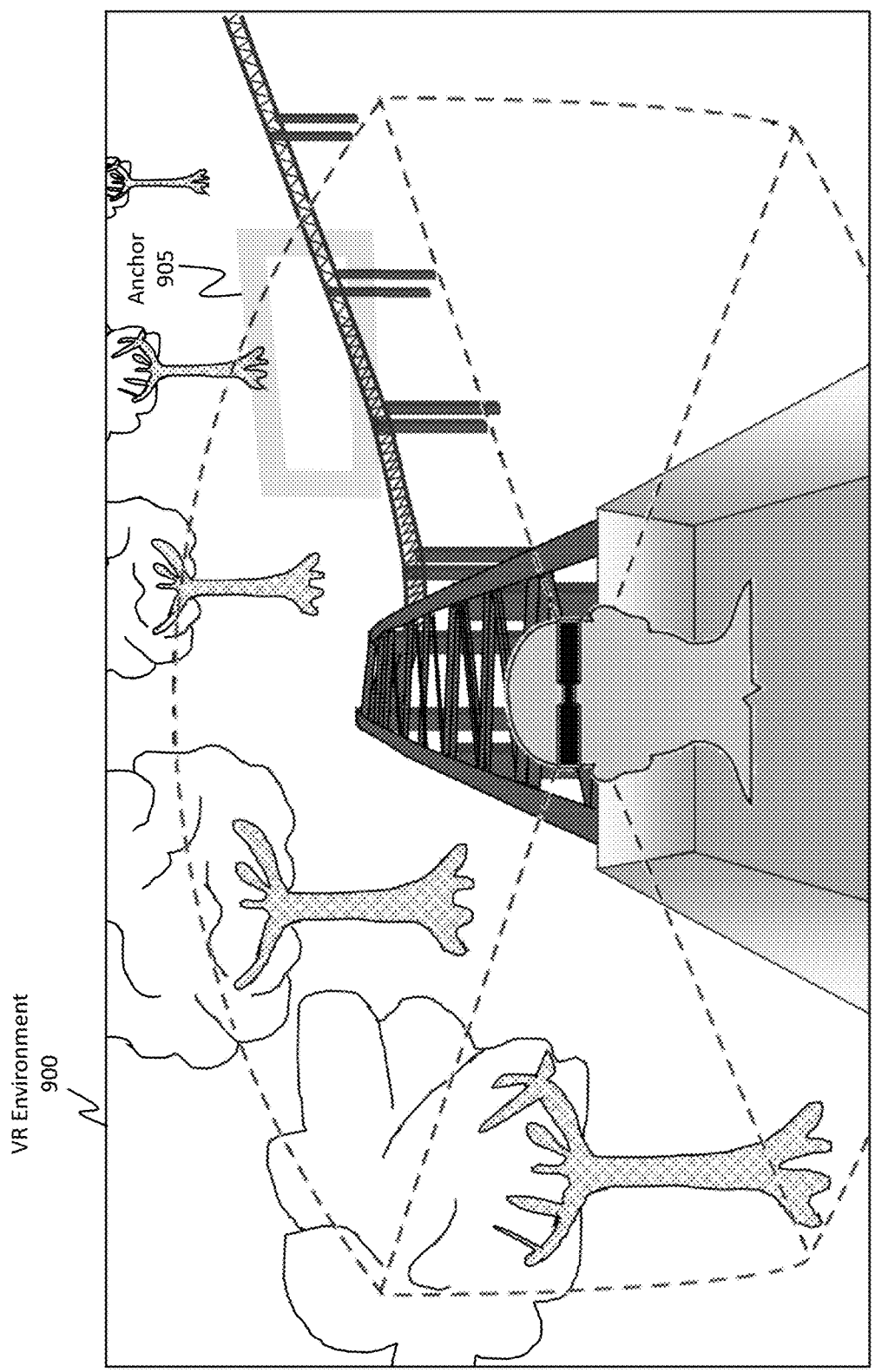
FIG. 9 illustrates how the virtual anchor object may be displayed using different visual characteristics in order to either enhance or reduce its visual impact on the VR environment.

Attention will now be directed to FIG. 9, which shows another example VR environment 900 with a rendered anchor 905. Here, anchor 905 is rendered as being at least partially transparent in VR environment 900 so that anchor 905 only partially occludes other virtual content in VR environment 900. For instance, anchor 905 is shown as being displayed overtop a portion of the rollercoaster track and a tree. Because anchor 905 is transparent, the underlying rollercoaster track and tree are still visible to the user. In this regard, various visual properties of anchor 905 may be modified in different manners. In some instances, the visual properties may be changed automatically while in other instances the properties may be changed manually. Modifications to anchor 905's visual appearance may be made to its transparency, color, shape, outline, fill, three-dimensional characteristics, continuously displayed state, and blinking state.

As an example, FIG. 9 shows that the shape of anchor 905 corresponds to the shape of the picture frame from FIG. 3. That is, the attributes of the real-world object (e.g., the rectangular picture frame) may be used to determine the shape or outline of anchor 905. Furthermore, the visual differences in shape between anchor 705 from FIG. 7 and anchor 805 from FIG. 8 show that the rendered shape may be dependent on the current depth, angular alignment (e.g., pitch, yaw, and roll), obliqueness, orientation, and perspective of the real-world anchor object relative to the HMD. For instance, if the picture frame were immediately in front of the HMD, then the rendered anchor object would be rendered in a rectangular shape. If the user were to move the HMD so that the picture frame progressively moved away and towards the user's peripheral vision, then the shape of the rendered anchor object would also progressively change (e.g., perhaps from that of a rectangle to that of an angled polygon to match the peripheral view of the picture frame). In this manner, the shape of the anchor 905 may dynamically change to coincide with the depth, orientation, angular alignment, obliqueness, and perspective of the real-world anchor relative to the HMD.

FIG. 9 also shows that anchor 905 is an outline of the picture frame from FIG. 3 as opposed to being entirely filled. It will be appreciated that the thickness of the borders of the outline may be configurable, either automatically or manually. In some embodiments, instead of being an outline of the real-world anchor, the anchor 905 may be entirely filled. Similarly, instead of being rendered as a two-dimensional planar object, anchor 905 may be rendered as having three-dimensional characteristics. Additionally, the color of anchor 905 may be configurable. In some instances, the color may correspond to the real-world color of the real-world anchor while in other instances the color may be entirely unique. Some embodiments display the virtual anchor object as having a shape that is entirely different than the shape of the real-world anchor object. For instance, some embodiments shape the virtual anchor object as a star (as shown later in FIG. 18A) or perhaps even as an anchor. The star may be representative of the north star which ancient travelers used as a guide in their travels. In this regard, the star virtual anchor object can lead the user so that the user can avoid colliding with real-world obstacles. In other embodiments, the visual appearance of anchor 905 may accurately reflect the appearance of the real-world anchor object. For instance, anchor 905 may be visualized as a picture frame with the same picture as the real-world picture. In some instances, this picture frame and picture may be transparent. In other instances, as generally shown later in FIG. 17, the virtual anchor can be textured with a live stream, or pre-recorded buffered stream, coming from the headset's tracking camera showing real images of the anchor object, the VR environment, or even any other object. Of course, combinations of the above features may also be used.

In some embodiments, the state/visual appearance of anchor 905 may change based on the user's proximity to any real-world object/obstacle. For instance, if, as the user moves in response to the stimuli provided by the VR environment, the user moves near a real-world obstacle, the visual appearance of anchor 905 may change to alert the user that he/she is about to collide with the obstacle. As an example, anchor 905 may initially be displayed in a continuous manner when no collisions are likely to occur and then subsequently begin to flash, blink, or otherwise change in visual appearance when a collision is likely to occur. This blinking may occur slowly once the user is within a threshold distance to an obstacle, but the blinking may progressively get faster as the user gets nearer to the obstacle. Additionally, or alternatively, the color may change (e.g., from a non-emphasized color to a bright emphasized color such as red) to reflect a possible collision. Similarly, the transparency may change (e.g., to become less transparent and thus more emphasized). Anchor 905 may also become more filled (e.g., going from just a small border outline to an entirely filled-in object), and so on. In this regard, changes to the visual appearance of anchor 905 may be used to alert the user when an imminent collision with a real-world obstacle is about to occur. In some embodiments (as described in later figures), the anchor object is a screen of a separate computer system. The screen may, but need not, be represented by its outline if the user is far away. When the user comes closer to the 2D (or perhaps 3D) rectangular outline (or at least to within a threshold distance of the anchor object), the outline may be filled using the real screen content as texture. In this manner, the user can, for example, type text and see the result on the virtual screen in real-time or near real-time.

Figure 10:
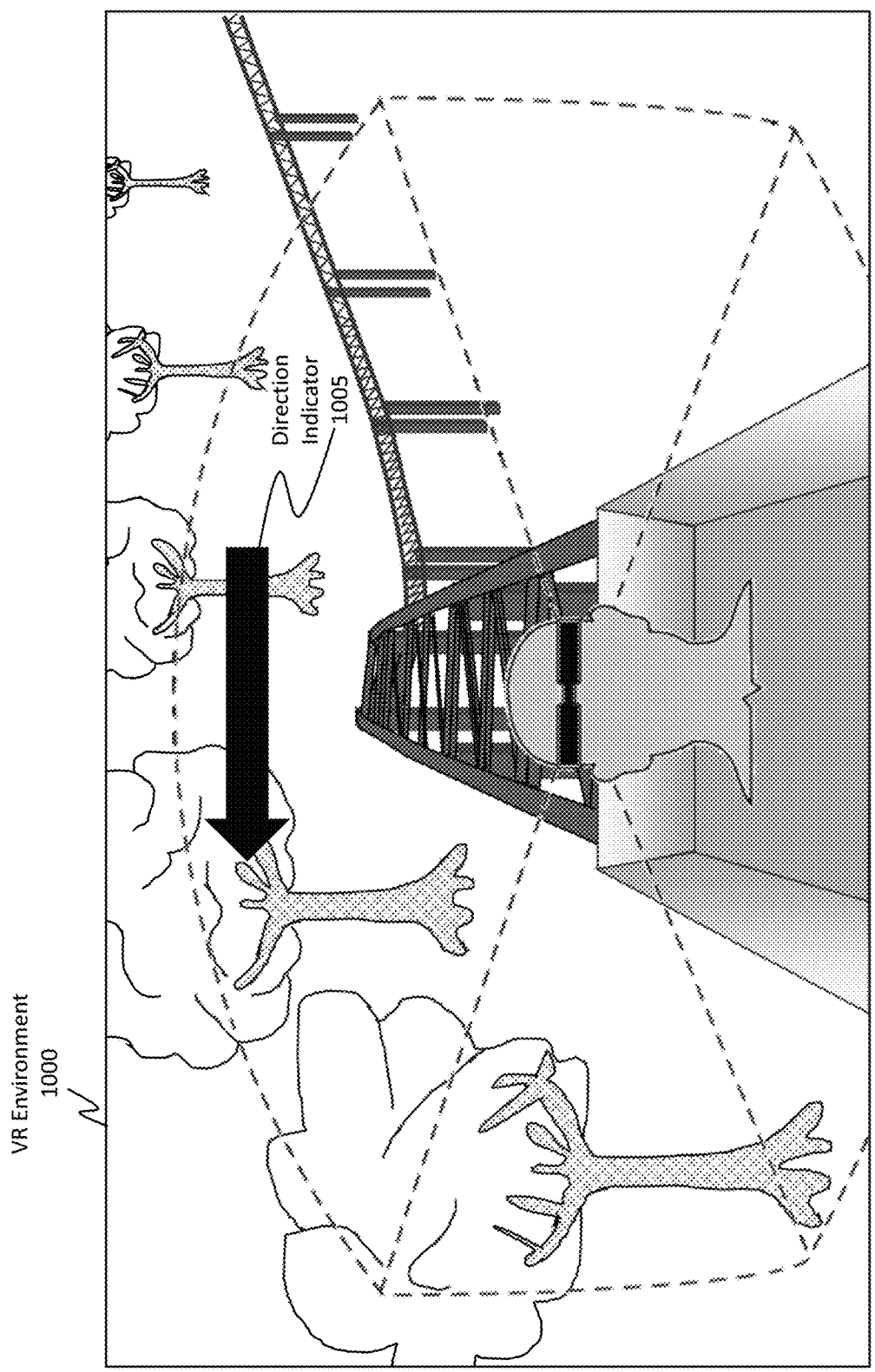
FIG. 10 illustrates how, in the event that the HMD moves in a manner such that the virtual anchor object leaves the HMD's FOV, a direction indicator may be displayed to show how the HMD would have to be moved in order to bring the virtual anchor object back into the HMD's FOV.

FIG. 10 shows a scenario where, as a result of the HMD being moved, the virtual anchor object is no longer being displayed within the HMD's FOV (i.e. the virtual anchor object is positioned outside of the HMD's FOV) of the VR environment 1000. As a result of the virtual anchor object being outside of the FOV, a second virtual anchor object (i.e. the direction indicator 1005) is rendered in the FOV and is provided to indicate a direction of movement that the HMD would have to be moved in order to bring the virtual anchor object back into the HMD's FOV. With reference to FIG. 10, the HMD would have to be moved to the left (as indicated by the left arrow of the direction indicator 1005) in order to bring the virtual anchor object into the HMD's FOV. Of course, the size, color, transparency, and other visual characteristics of direction indicator 1005 may be modified in any of the manners discussed previously. In some embodiments, the length of the direction indicator 1005 may be reflective of the distance or depth between the HMD and the anchor object, where longer direction indicators suggest a further distance while shorter direction indicators suggest a shorter distance.

Figure 11:
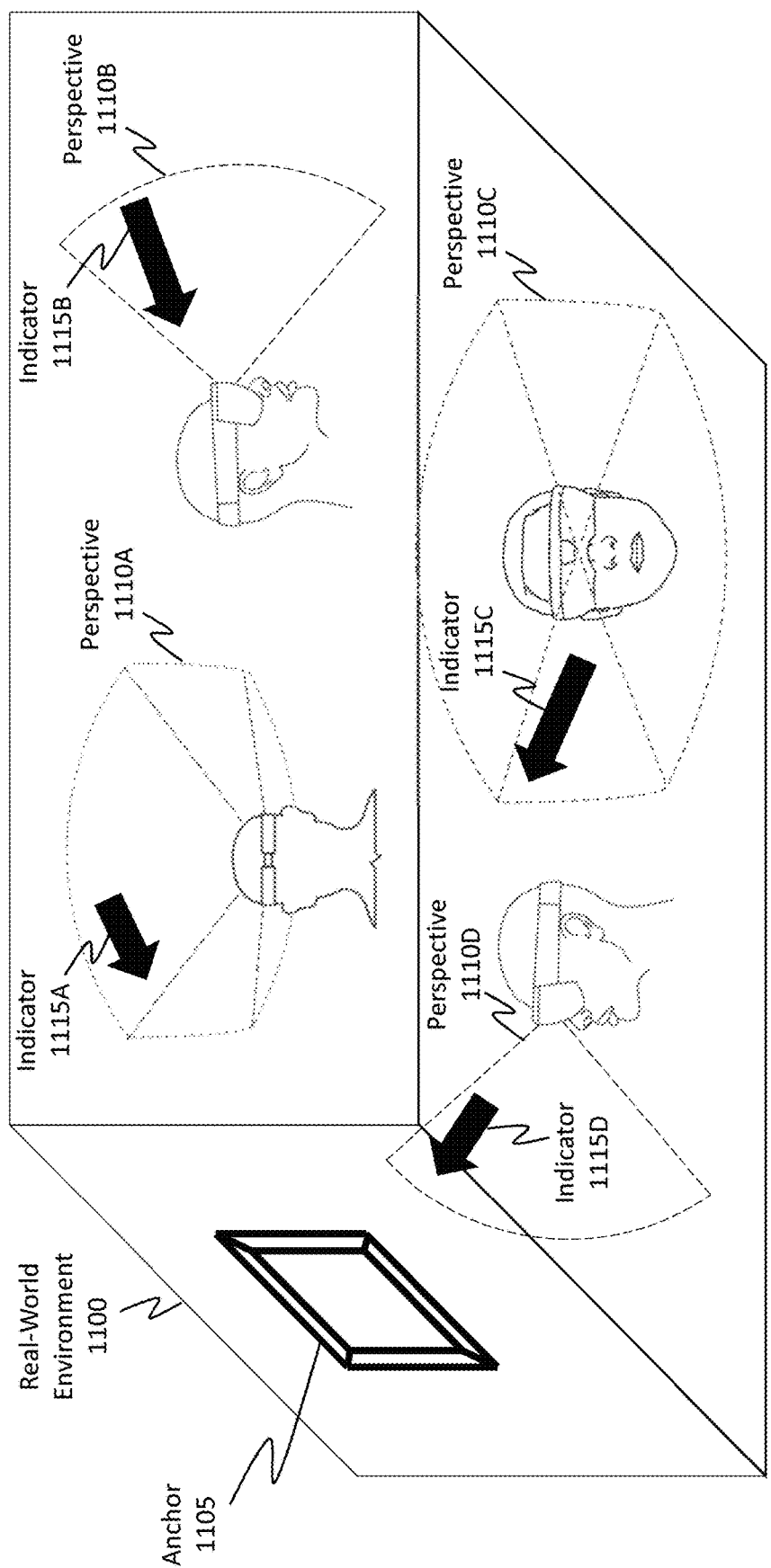
FIG. 11 illustrates how, regardless of how the HMD is oriented within the real-world environment, a direction indicator may be provided to indicate where the real-world anchor object is located relative to the HMD.

FIG. 11 shows another illustration of how a direction indicator may be used to assist a user in remaining cognizant of his/her real-world environment. More specifically, FIG. 11 shows a real-world environment 1100, which is representative of any of the real-world environments discussed previously, an anchor 1105, and a user who is wearing a HMD within that real-world environment 1100. The user is shown as being located at different positions, depths, angular alignments, and orientations relative to the anchor 1105, as shown by perspective 1110A, perspective 1110B, perspective 1110C, and perspective 1110D.

In perspective 1110A, the indicator 1115A shows that the user would have to move the HMD to the left, or rather counterclockwise, approximately 90 degrees in order to bring the anchor 1105 into the HMD's FOV. In perspective 1110B, the indicator 1115B shows that the user would have to move the HMD to the left (e.g., counterclockwise) or right (e.g., clockwise) approximately 180 degrees in order to bring the anchor 1105 into the HMD's FOV. From perspective 1110C, indicator 1115C shows that the user would have to move the HMD to the right (e.g., clockwise) approximately 90 degrees to bring anchor 1105 into the HMD's FOV. Finally, from perspective 1110D, indicator 1115D shows that the user would have to move the HMD slightly upward to bring anchor 1105 into the HMD's FOV. In this regard, the virtual anchor object may be a pointing indicator that, based on the direction/orientation it is pointing towards, may visually indicate the positional relationship between the real-world anchor and the HMD.

Using an Internet of Things ("IoT") Device as the Real-World Anchor Object

Figure 12:
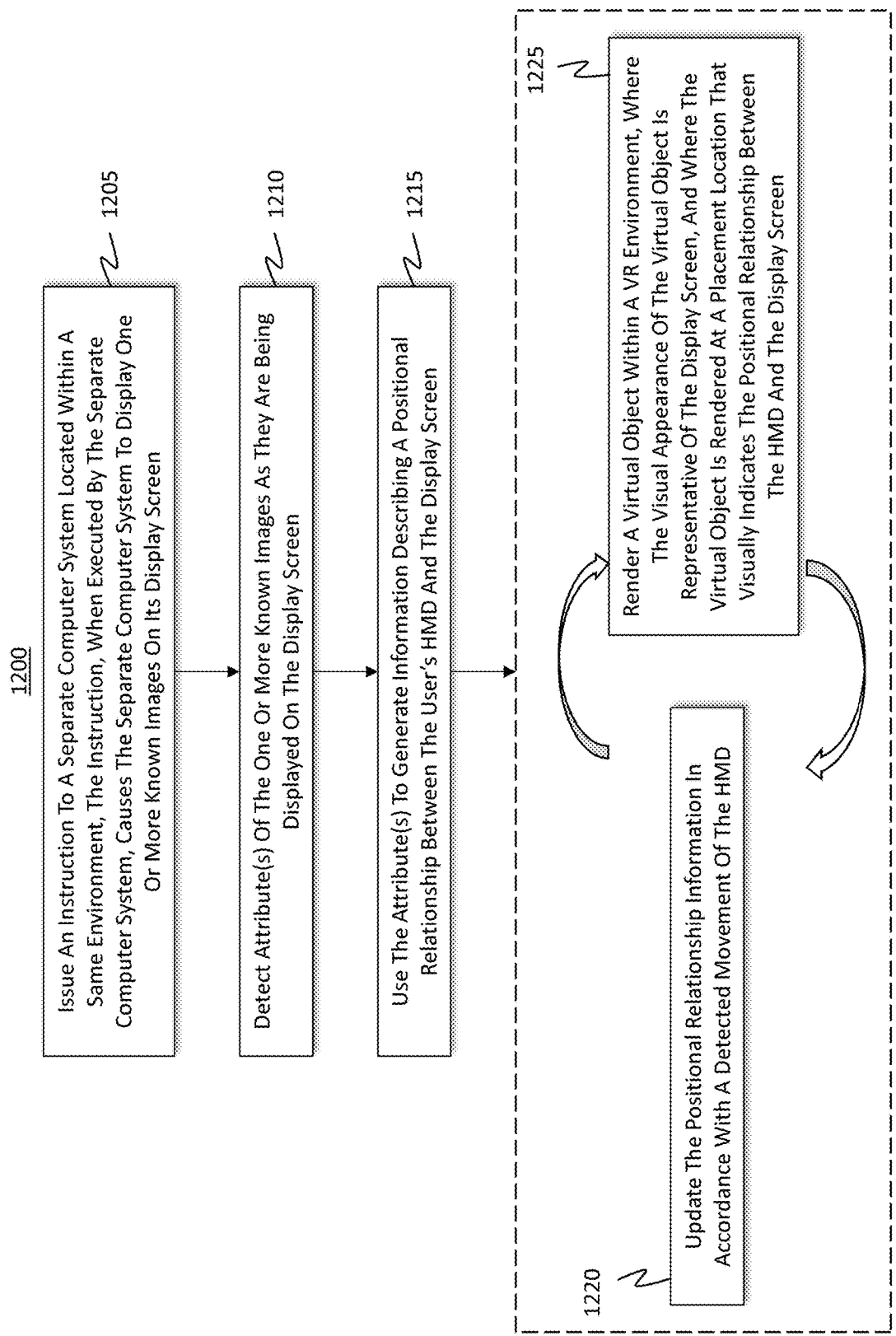
FIG. 12 illustrates a flowchart of an example method for selecting a computer screen to operate as an anchor object and for displaying a corresponding virtual anchor object within a VR environment.

In some embodiments, an electronic display screen (e.g., a TV, a laptop screen, a desktop screen, a mobile phone screen, a gaming console screen, etc.) may be used as the real-world anchor object. Furthermore, some embodiments are configured to perform one or more calibrations with the display screen to provide enhanced information regarding the positional relationship between the display screen and the HMD. FIG. 12 shows a flowchart of an example method 1200 in which a display screen is selected to operate as the real-world object.

Initially, method 1200 includes act 1205 where an instruction (e.g., either from the HMD or from another system, such as a cloud VR managing system) is issued to a separate computer system that is determined to be located within a same environment as the HMD. This instruction, when executed by the separate computer system, causes the separate computer system to display one or more known images on its display screen.

Figure 13:
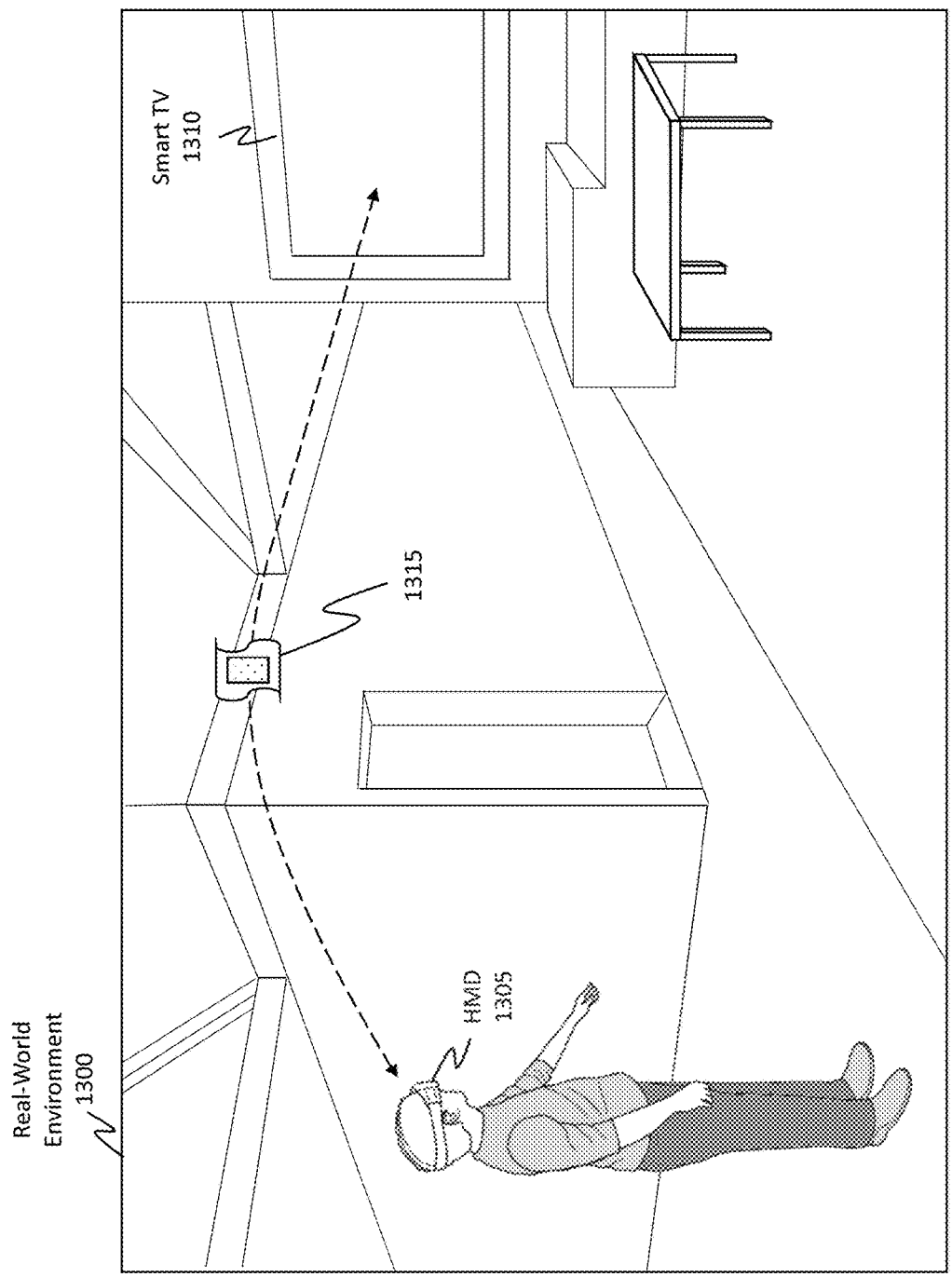
FIG. 13 illustrates a real-world environment in which an Internet of Things ("IoT") device (e.g., a smart TV) is selected to serve as the anchor object.

As an example, consider the scenario presented in FIG. 13. Here, there is a real-world environment 1300 with a user wearing a HMD 1305. Included within real-world environment 1300 is a smart TV 1310. It will be appreciated that while FIG. 13 shows the presence of a smart TV, other Internet of Things (IoT) devices, with corresponding processor(s) and communication channel(s), may also be present and may be substituted in place of (or in addition to) smart TV 1310, such as smart phones, laptops, tablets, gaming consoles, desktops, etc. In this scenario, the HMD 1305 has a communication channel open with the smart TV 1310 and is able to pass instructions to the smart TV 1310 via this open communication channel. Examples of these channels include, but are not limited to, near field communications (NFC), Bluetooth, other types of wireless connections, a tethered connection, or any other connection that may be made between multiple electronic devices.

As described in act 1205 of FIG. 12, in some embodiments, the HMD 1305 of FIG. 13 (or some other computer system) is able to transmit an instruction 1315 to the IoT device (e.g., smart TV 1310). The instruction 1315 is configured so that, when the smart TV 1310 processes the instruction 1315, the smart TV 1310 will render one or more known images on its display screen.

Figure 14:
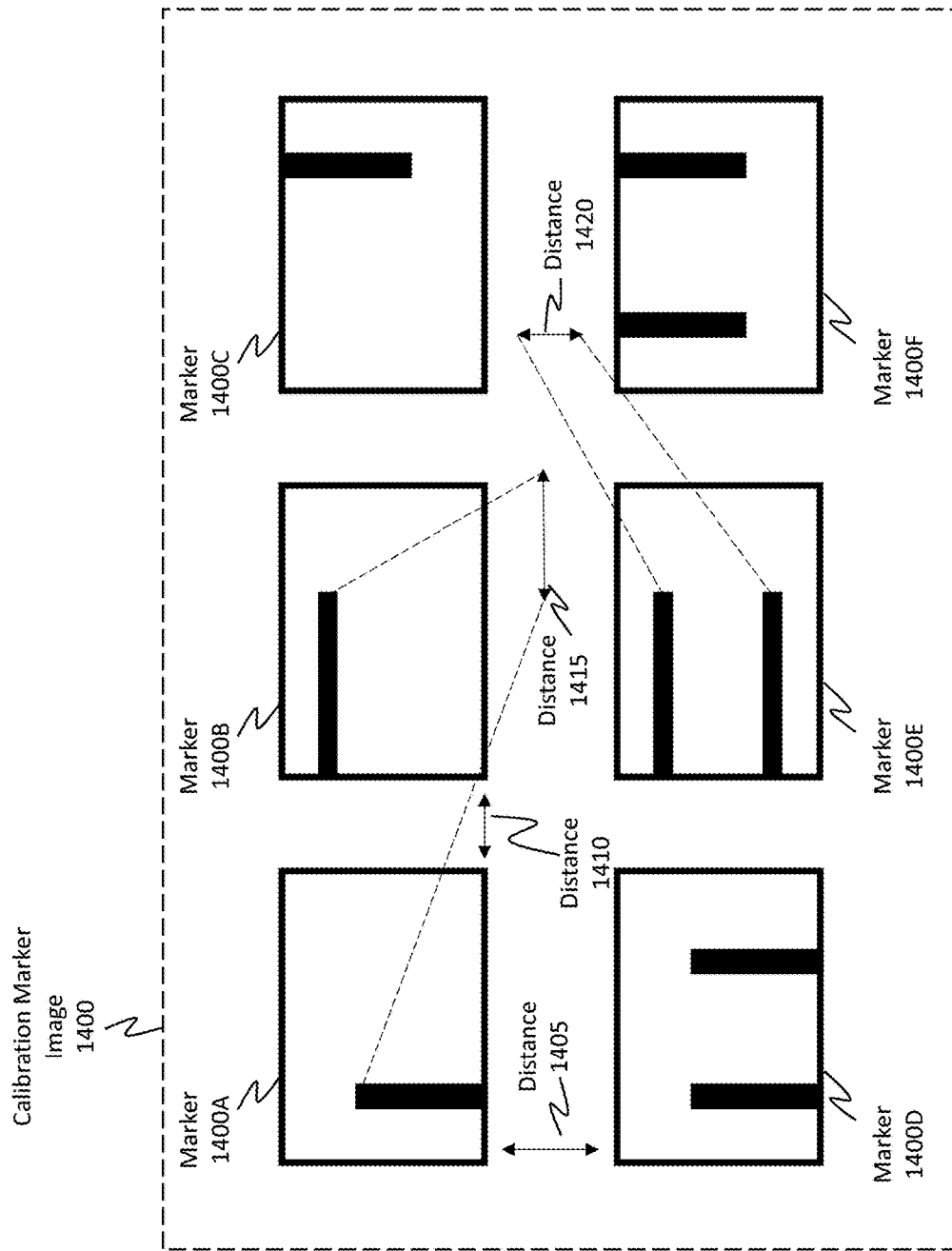
FIG. 14 illustrates how a calibration marker image may be used to facilitate the process of determining the relative position between the HMD and the display screen of a IoT device.

One example of these known images is a calibration marker image 1400, as shown in FIG. 14. More specifically, calibration marker image 1400 may be comprised of any number of images, such as, for example, marker 1400A, marker 1400B, marker 1400C, marker 1400D, marker 1400E, and marker 1400F. As shown, each of the markers 1400A-F may be unique from one another (e.g., the bolded lines are configured differently in each of those markers). Additionally, the distances between each individual marker (i.e. markers 1400A-F) within the calibration marker image 1400 may be known. To illustrate, the distance 1405, the distance 1410, the distance 1415, and the distance 1420 may be pre-established and known by the HMD. It will be appreciated that any number of points within the calibration marker image 1400 may be selected, and the distance between those points may be maintained and known.

In some embodiments, the process of causing the display screen to display the known image and the process of the HMD determining its position/orientation relative to the display screen (e.g., by determining the distances between the markers in the known image) constitutes an initial calibration process. That is, the real-world object chosen to operate as the anchor object may be a display screen of a separate computer system. Furthermore, the process of selecting this display screen to operate as the anchor object may include performing the above-recited calibration between the display screen and the HMD.

In some embodiments, this calibration process may be repeated multiple times while the user is immersed within the VR environment. By performing this calibration process multiple times, the HMD is able to correct any drift that may occur in the HMD's understanding of its placement within the real-world environment.

It will also be appreciated that the display screen may display the calibration marker image for only a temporary period of time. For example, in some cases, the HMD may be tethered to the separate display screen. This tethering allows the display screen to display the same content that the user of the HMD is viewing, thereby allowing other friends or users to watch as the user engages with the VR environment. In an effort to minimize the disruption to the other viewers, the calibration marker image may be displayed until such time as the HMD has successfully captured a clear image of the display screen, including the calibration marker. Once the captured image is analyzed and determined to be of a high enough quality (i.e. it satisfies a quality threshold), then the HMD may issue another instruction to the separate computer system instructing it that the calibration marker image may be removed. Additionally, or alternatively, a timeout period may elapse thereby causing the calibration marker image to be automatically removed.

Figure 15:
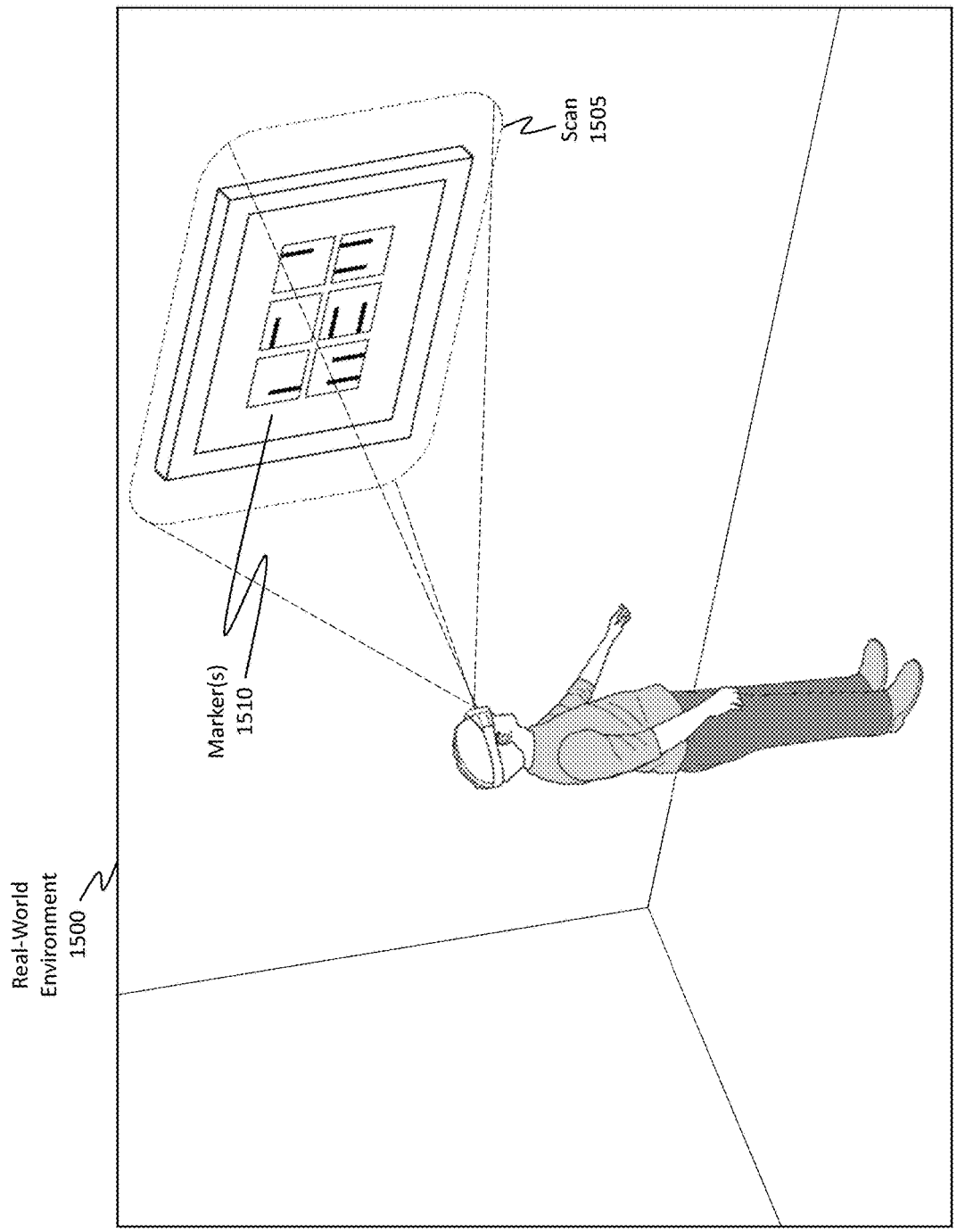
FIG. 15 illustrates how the HMD is able to record an image of the calibration marker image while the calibration marker image is being displayed on the display screen of the IoT device in order to determine the relative position and orientation between the HMD and the display screen.

Returning to FIG. 12, once the known images (e.g., the calibration marker image) are displayed on the separate computer system's display screen, then one or more attributes of the known images are detected as those images are being displayed on the display screen (act 1210). For example, FIG. 15 shows a real-world environment 1500 in which a HMD is scanning 1505 the real-world environment 1500 using one or more of its cameras (e.g., one or more tracking cameras such as head tracking cameras) in order to detect the known images that are being displayed on the Smart TV (e.g., the markers 1510). By performing this scanning 1505, the HMD is able to record an image of the markers 1510 and determine their attributes, such as, for example the spacing between the individual markers included within marker 1510. Because the spacing was previously established and known by the HMD, the HMD is able to analyze the captured image, calculate the spacing as presented in the recorded image, and then determine the positional relationship between the HMD and the smart TV based on the relationship between the actual spacing values and the spacing values recorded in the captured image.

Figure 16C:
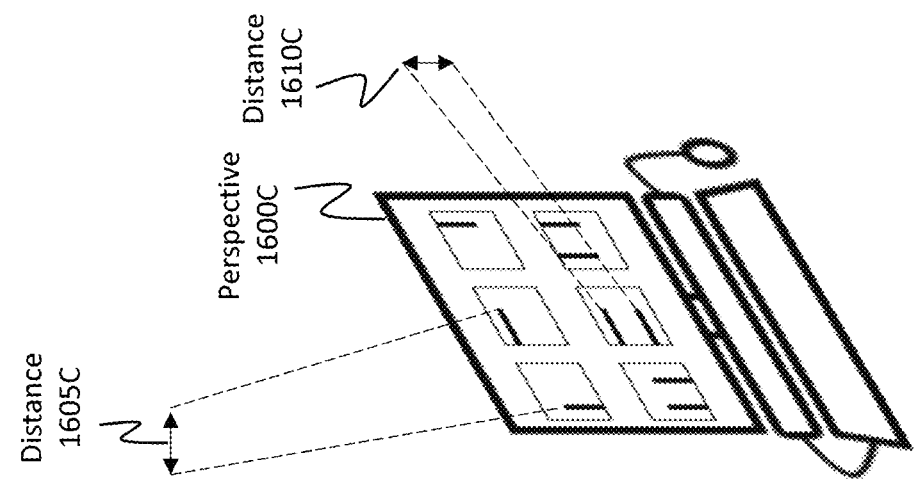
FIGS. 16A, 16B, and 16C show how the distances between each marker included within a calibration marker image may be used to facilitate the calibration process (i.e. the process of determining the relative position between the IoT device's display, which comprises an anchor, and the HMD).
Figure 16B:
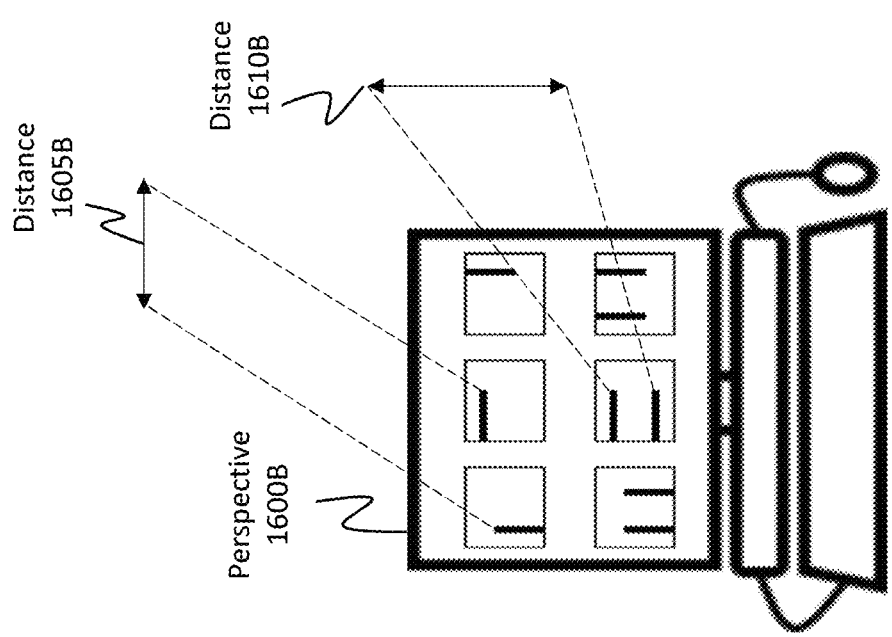
Figure 16A:
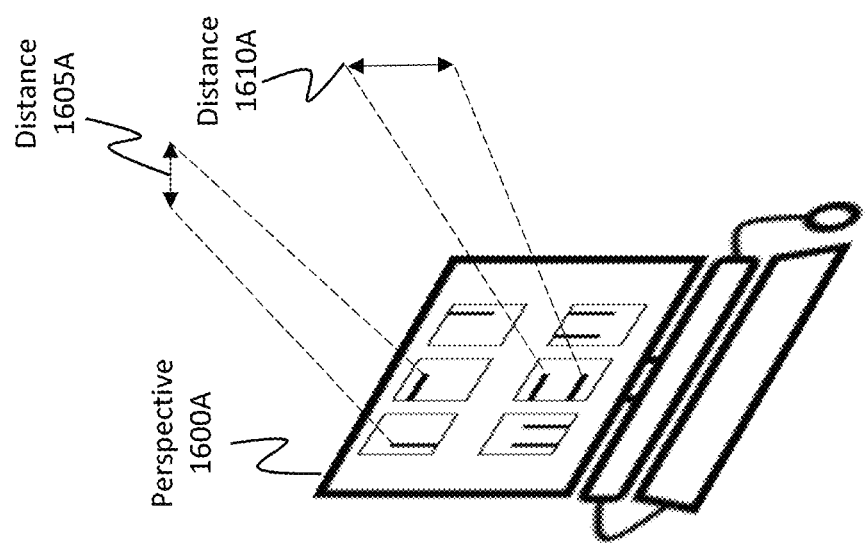

The above process is embodied within act 1215 of method 1200 in which the one or more attributes of the one or more known images are used to generate information describing a positional relationship between the computer system and the separate computer system's display screen. FIGS. 16A, 16B, and 16C more fully demonstrate this concept.

In particular, FIG. 16A shows a captured image (e.g., using the HMD's tracking cameras) of a marker image being displayed on a display screen (e.g., a desktop screen, though the smart TV screen or any other screen may have been used). In this embodiment, the captured image (e.g., the image captured by the HMD) includes the display screen, the markers on the display screen and the entire computer.

In FIG. 16A, the depth, orientation, angular alignment (e.g., pitch, yaw, and roll), obliqueness, and position of the HMD relative to the display screen is reflected by the perspective view of the computer shown at 1600A. By capturing an image of the display screen while the screen is displaying the known image, the HMD is able to compute the distance 1605A between the individual markers included in the calibration marker image. To illustrate, by comparing the captured/recorded distance 1605A with the known distance (e.g., distance 1415, 1410, 1415, or 1420 from FIG. 14), the HMD is able to accurately determine its position, depth, angular alignment, obliqueness, and orientation relative to the display screen. This information is then used to ensure that the anchor (e.g., the markers or the display screen boundaries or other corresponding image associated with the markers, or even another object/anchor in the real-world environment having a known relative position to the markers) is presented as an anchor with the proper positioning and size within the VR environment. Because each point in the markers is known (e.g., the length, width, height, boldness, etc.), the embodiments are able to compare the recorded image of the markers, determine the points within the recorded image, and then compare the recorded point attributes against the known point attributes. From this comparison, the embodiments are able to determine the HMD's location relative to the displayed markers. It will be appreciated that any number of points may be used during this analysis, though a larger number of point comparisons will typically result in a more accurate determination. Of course, the embodiments are able to intelligently select and use an optimal number of points in order to reduce time and resource expenditure. Furthermore, the embodiments may perform the analysis on a rolling basis. That is, at first, a selected number of points may be used. If, during the course of the analysis, it is determined that more points should be used, then the embodiments are able to incrementally add to the number of points until a reliable determination is achieved.

FIG. 16B shows another perspective view 1600B of the computer and corresponding displayed image and markers (with the perspective being a perspective as viewed by the HMD), where the distance 1605B for a set of markers will be different than the distance 1605A for the same set of markers, as a result of perspective 1600B being different than perspective 1600A. Similarly, FIG. 16C shows yet another perspective view 1605C of the computer and corresponding display and markers, with recorded/calculated distance 1600C for the set of markers. Based on the different depths, angular alignments, orientations, and perspectives, an accurate positional relationship between the display screen and the HMD may now be determined based on the changes in the known distances of the markers and their detected distances in the various perspectives (e.g., 1600A, 1600B, 1600C).

Figure 16D:
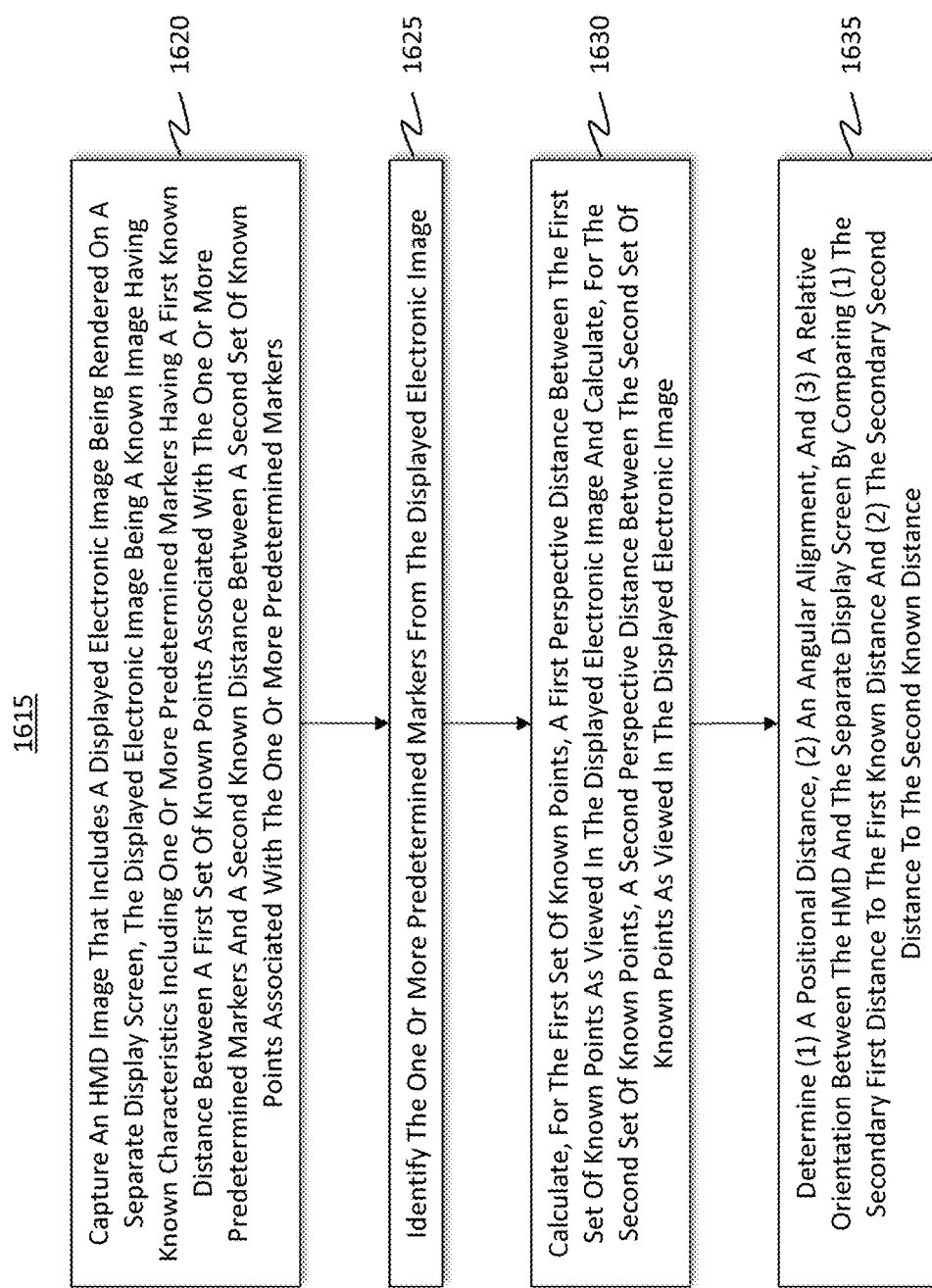
FIG. 16D illustrates a flowchart of an example method for calibrating the marker image or anchor with the HMD.

FIG. 16D provides a flowchart of an example method 1615 for calibrating positional distance, angular alignment, and relative orientation between the HMD and an electronic image that is being rendered on a display screen of a separate computer system. Such a process may be included as a part of the method acts 1210 and 1215 of method 1200 from FIG. 12.

Initially, method 1615 includes an act 1620 of using one or more of the HMD's cameras to capture an HMD image of a displayed electronic image that is being rendered by a separate computer system (e.g., on a display screen associated with the separate computer system, or a projected image, for example). For example, any of the perspectives 1600A, 1600B, and 1600C from FIGS. 16A-C may be representative of the above recited image that includes the displayed electronic image with its correspondingly known calibration markers. The calibration markers have known image characteristics that are defined and stored in an image file and/or that are detected with an image of the HMD.

Nonlimiting examples of characteristics that may be known include a first known distance between a first set of two known points included within the known image (e.g., distance 1405 from FIG. 14, between markers in the image) and a second known distance between a second set of two known points included within the known image (e.g., distances 1405, 1410, 1415, or 1420 from FIG. 14). It will be appreciated that any number of points and any number of distances may also be used and the distances are not limited to distances between rectangular bars (e.g., they could include diameters of a shape, a distance between a display element an edge of the displayed image, or any other distance having a known dimension). Additionally, or alternatively, some embodiments also determine line widths (e.g., the widths of the dark rectangles in FIG. 14) or other visual characteristics.

After capturing the HMD image with the HMD's cameras (thereby preserving the vantage perspective between the HMD and the display screen), the HMD (or some other service such as, for example, a cloud service) isolates and/or identifies the calibration markers from within the HMD image. This may include identifying two separate sets of points associated with the markers and which have predetermined first and second known distances, respectively.

In some instances, the marker identification/extraction is performed using image filters to identify tags associated with the markers and/or object recognition software to identify the calibration markers that are predetermined and known to exist in the displayed image and that are rendered in the displayed electronic image with a certain perspective (act 1625). To clarify, the captured image may, for example, be an expansive image that includes not only the calibration marker image but also other objects (e.g., a couch, fixture, etc.). Consequently, the embodiments are able to identify/extract the relevant calibration markers from the image. These markers, which have known distances and other dimensions associated with them, will be viewed in the captured image with different perspective dimensions (e.g., distances, sizes, etc.) based on the relative perspective with which the HMD views the calibration markers. For instance, the distance between two markers seen at an angle will appear to be smaller than the actual distance between the markers.

FIG. 15, for example, shows a scenario where the HMD is separated by a distance from the markers 1510. Because of this difference, the secondary electronic image will include some differences in visual appearance when compared with the actual image. For instance, if the HMD were immediately in front of the screen, then the differences in visual appearance will be relatively minor. In contrast, if the user were 2 meters (or 3, 4, 5, or any other distance) away and positioned at a non-perpendicular (i.e. oblique) angle relative to the display screen, then the differences will be more pronounced, as shown by the differences between perspective 1600A, 1600B, and 1600C in FIGS. 16A-C, respectively. In FIG. 15, the user is slightly below and away from the markers 1510. Because of this perspective, the distances between each known point in the markers 1510 will be slightly skewed. Using this skew, the embodiments are able to compare the recorded image of the markers 1510 with the known attributes of the markers 1510 to determine the user's positional relationship relative to the markers 1510.

Thereafter, the HMD calculates, for a first set of known points associated with the markers, a first perspective distance between a first set of known points for the markers, as viewed within the displayed electronic image. (Act 1630 in FIG. 16D). Likewise, the HMD calculates, for a second set of known points associated with the markers, a second perspective distance between a second set of known points for the markers, as viewed within the displayed electronic image. (Act 1630 in FIG. 16D).

Next, the HMD determines (1) a positional distance between the HMD and the separate computer system's display screen, (2) an angular alignment between the HMD and the separate computer system's display screen, and (3) a relative orientation between the HMD and the separate computer system's display screen by comparing at least (1) the first perspective distance to the first known distance associated with the markers, as well (2) the second perspective distance to the second known distance associated with the markers (act 1635 in FIG. 16D). In this manner, the HMD is able to accurately determine its location (including depth, angular alignment, and orientation) relative to the display screen may analyzing and comparing the attributes of the recorded image against the known attributes of the pre-established image. As an example of angular alignment, consider a camera's "optical axis." As used herein, an optical axis refers to an imaginary line passing through the camera lens' center. This imaginary line can be thought of as the direction in which the camera is being aimed. If the camera's optical axis were aimed perpendicularly to the central area of the calibration markers, then the calibration markers will appear to have less skew, or rather angular displacement, then scenarios where the camera's optical axis were aimed at the calibration markers in a non-perpendicular manner. As such, when reference is made to "angular alignment," it is generally meant the angular displacement (from perpendicular) that the camera's optical axis is relative to the calibration marker's central point or area.

In some embodiments, the quality of the secondary electronic image may not satisfy a quality threshold requirement as a result of the HMD being too far removed/distant from the separate display screen, or as a result of the display displaying the electronic image being too reflective or having too much glare/shine. In these cases, it is beneficial to trigger the separate computer system to render a different image having different markers with known point dimensions/distances on the same display screen or a different display screen or even to cause a different display screen to render the image (e.g., as shown later in FIG. 18B). The different image can have different content or simply enlarged content. In some embodiments, the HMD is able to control the resolution settings of the display in an attempt to compensate for environmental factors, such as glare. As an example, some embodiments are able to reduce or increase the brightness or resolution of the display screen. Furthermore, in real-world environments that include many Internet Of Things (IoT) devices (e.g., lights, shades, etc.), some embodiments are able to lower the blinds, increase or decrease the dimness/brightness of overhead lights, or perform any other action to improve visibility in the real-world environment.

The relatively larger version of the electronic image or the new electronic image replaces the electronic image displayed on the separate computer system's display screen. Once the larger or new image is displayed, the HMD then determines (1) the positional distance, (2) the angular alignment, and (3) the relative orientation between the HMD and the separate computer system's display screen using the relatively larger version of the electronic image or, alternatively, the new electronic image in place of the electronic image. This may be done by comparing the new set of known distances to a new set of captured perspective distances that are obtained from a new HMD image that is taken of the new displayed image.

In some embodiments, instead of displaying the electronic image on a display screen, the image may be a projected image using a projector. As an example, the projector may be instructed to project the image onto a wall in the real-world environment. Additionally, or alternatively, the image could be projected and reflected through any number of mirrors or other reflective surfaces. Additionally, or alternatively, the image may be printed on a piece of paper and hung on a wall or other highly visible area. Accordingly, the disclosed embodiments are able to determine the positional relationship (including depth, angular alignment, and orientation) of a displayed image (e.g., being displayed on a computer screen or being displayed by a projector projecting the image onto a surface) relative to the HMD, as long as the distances between the projected image and the projector are known, so as to identify/calculate the predetermined distances between the sets of displayed marker points.

It will be appreciated that after calibrating the HMD to the real-world, the HMD may render a virtual anchor object within a virtual-reality environment, where the virtual anchor object is rendered to reflect the positional difference between the HMD and the separate computer system's display screen, the angular alignment between the HMD and the separate computer system's display screen, and the relative orientation between the HMD and the separate computer system's display screen. This virtual anchor object may comprise one of the markers or displayed images described above.

Some embodiments perform multiple calibrations spread across multiple different time periods. That is, these embodiments are able to periodically re-calibrate by periodically causing the displayed electronic image to be re-displayed on the display screen. Once displayed, then the embodiments will capture one or more updated HMD images of the displayed electronic image. It will be appreciated that any number of HMD images may be captured. For instance, some embodiments capture only a single image while other embodiments perform a burst capture in which multiple images are obtained. If a burst technique is used, then the embodiments are able to analyze each of the burst images to identify the image having the highest image quality (e.g., the image with the least amount of camera distortion or other distortions).

In some embodiments, it will also be appreciated that, instead of displaying an image on a display screen to use for the calibration, an actual real-world object having known dimensions can be used to assist in calibrating the relative position of the HMD to the real-world.

By way of example, a couch, table, shelf, frame, light switch, door frame, or other furniture or fixture can be used, where the dimensions are known or obtained (e.g., from a third-party database or online automated query). The online/third party databases can also provide image definitions for the various objects to facilitate their identification and the identification of their markers (e.g., associated with acts 1620, 1625). In such instances, the objects themselves and known features/attributes of those objects could be used to perform the calibration methods described herein. For example, by comparing the known height and length dimensions of the couch with the perceived dimensions of the couch, as viewed from the HMD, a determination can be made of the HMD's relative position (e.g., distance, height, orientation, angular alignment, etc.) relative to the couch. Then, if a determination cannot be made, the HMD can trigger the selection of a different object and the process can repeat, as necessary. Once, the calibration is made, in some instances, that same object is used to generate a corresponding virtual object anchor in the VR.

Returning to FIG. 12, in most instances, the user will be moving around within the real-world environment. As such, the positional relationship information (i.e. the information describing the relationship between the HMD and the display screen) may be continuously or periodically updated in accordance with any detected movements of the HMD (act 1220). With those updates, the virtual anchor object rendered within the VR environment may also be rendered and either continuously or periodically updated to reflect the detected movements of the HMD (act 1225).

In some embodiments, instead of using a static image as the known image, a buffered video recording may be used as the known image. In this case, the process of generating the information describing the positional relationship between the HMD and the display screen is performed by comparing the buffered video recording as it is being played on the display screen of the separate computer system with a corresponding buffered video generated by the HMD. In some instances, the buffered videos may be recordings of what the user is viewing within the VR environment. In other instances, the buffered video may be entirely different than what the user is seeing.

Figure 17:
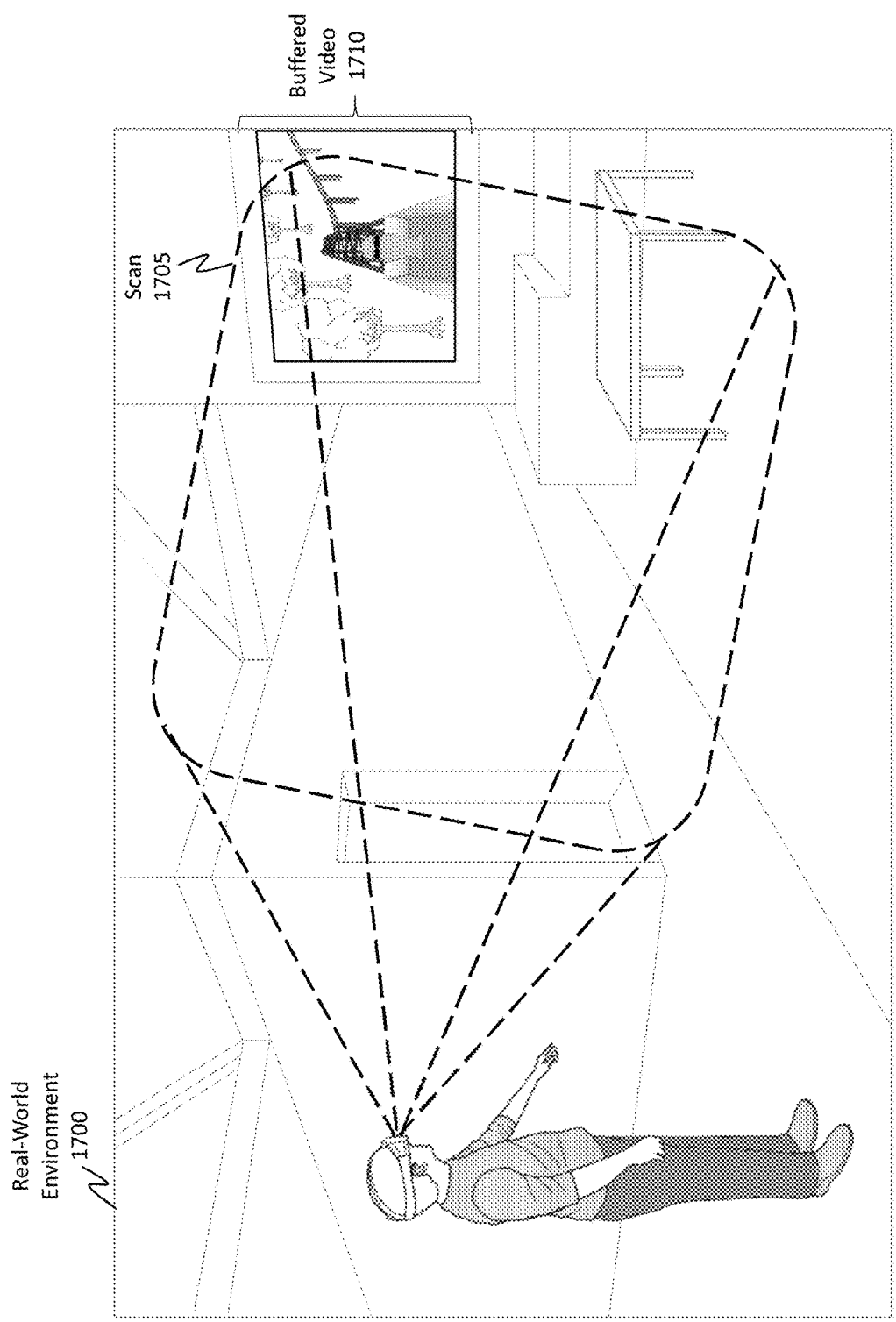
FIG. 17 illustrates how a buffered video may be used during the calibration process.

FIG. 17 shows an example scenario of a real-world environment 1700 where a HMD is scanning 1705 the display screen of a smart TV that is displaying a buffered video 1710. By recording the buffered video 1710 with its cameras, the HMD can compare the contents of the recorded buffered video 1710 with a corresponding video on the HMD in order to determine its positional relationship relative to the smart TV.

Figure 18A:
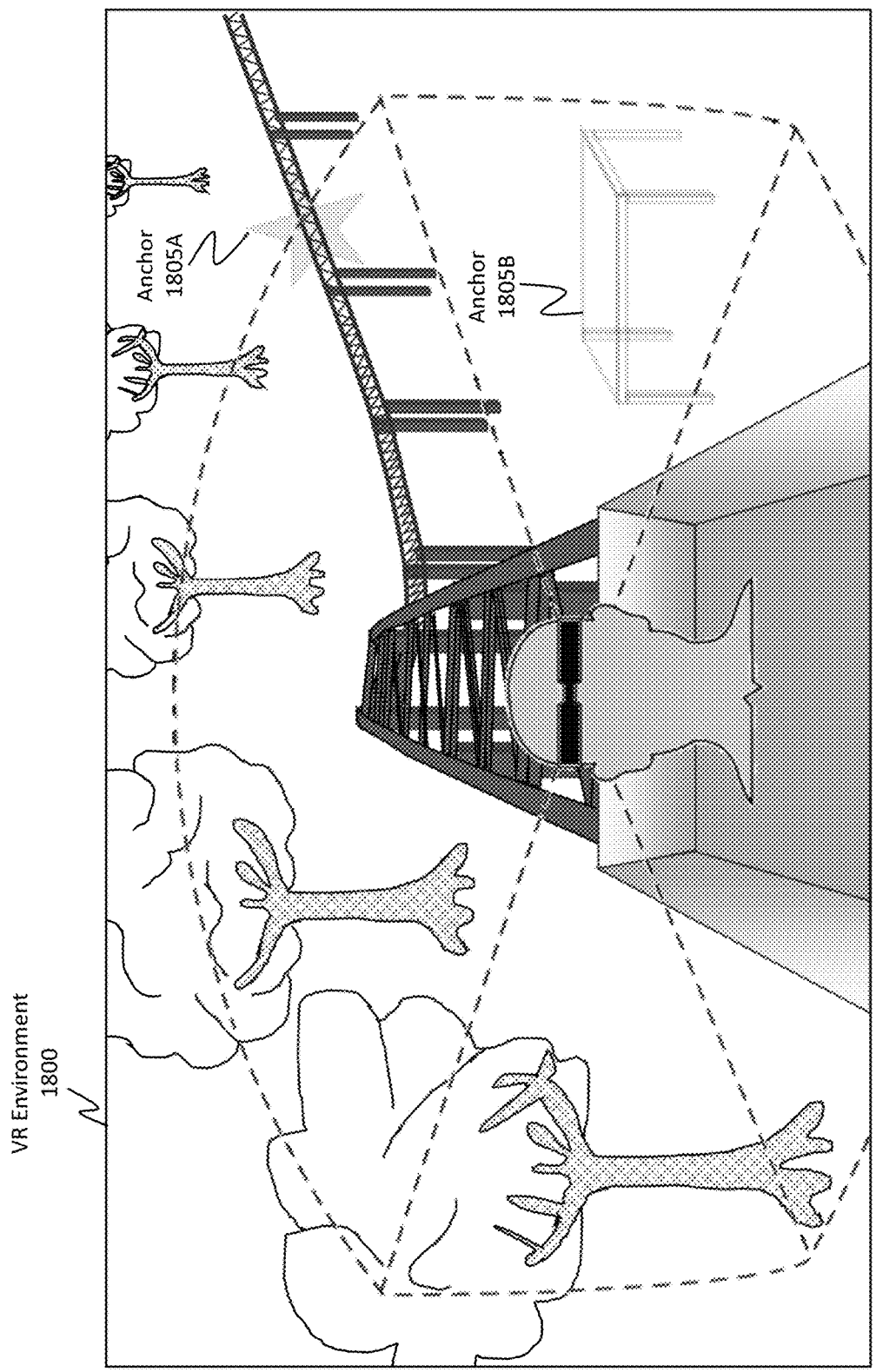
FIGS. 18A and 18B illustrate scenarios where multiple real-world anchor objects are provided and where multiple corresponding virtual anchor objects (including one shaped as a star) are rendered in a VR environment.

In many real-world environments, there may be many potential/candidate real-world objects that are suitable, or rather selectable, to operate as an anchor object. Therefore, in some embodiments, multiple real-world objects are selected as anchor objects. Such a scenario is shown in FIG. 18A in which a VR environment 1800 is being displayed as well as multiple anchor objects (e.g., anchor 1805A corresponding to the smart TV of FIG. 17 and anchor 1805B corresponding to a table in FIG. 17 but visualized as a star). Here, the two anchor objects 1805A and 1805B are displayed as being relatively close to one another as a result of their being close to one another in the real-world environment 1700 of FIG. 17. In some embodiments where multiple anchor objects are used, those anchor objects may be purposely selected to be distant from one another. As an example, the anchor objects may be selected so that there is ever only one anchor object displayed within a particular FOV at a time. As the FOV changes so that the one virtual anchor object leaves the FOV, another virtual anchor object may be brought into the FOV. In this regard, anchor objects may be spaced out across the real-world environment and may be selectively used to ensure that at least one (though potentially more) virtual anchor object is always displayed in the HMD's FOV.

Figure 18B:
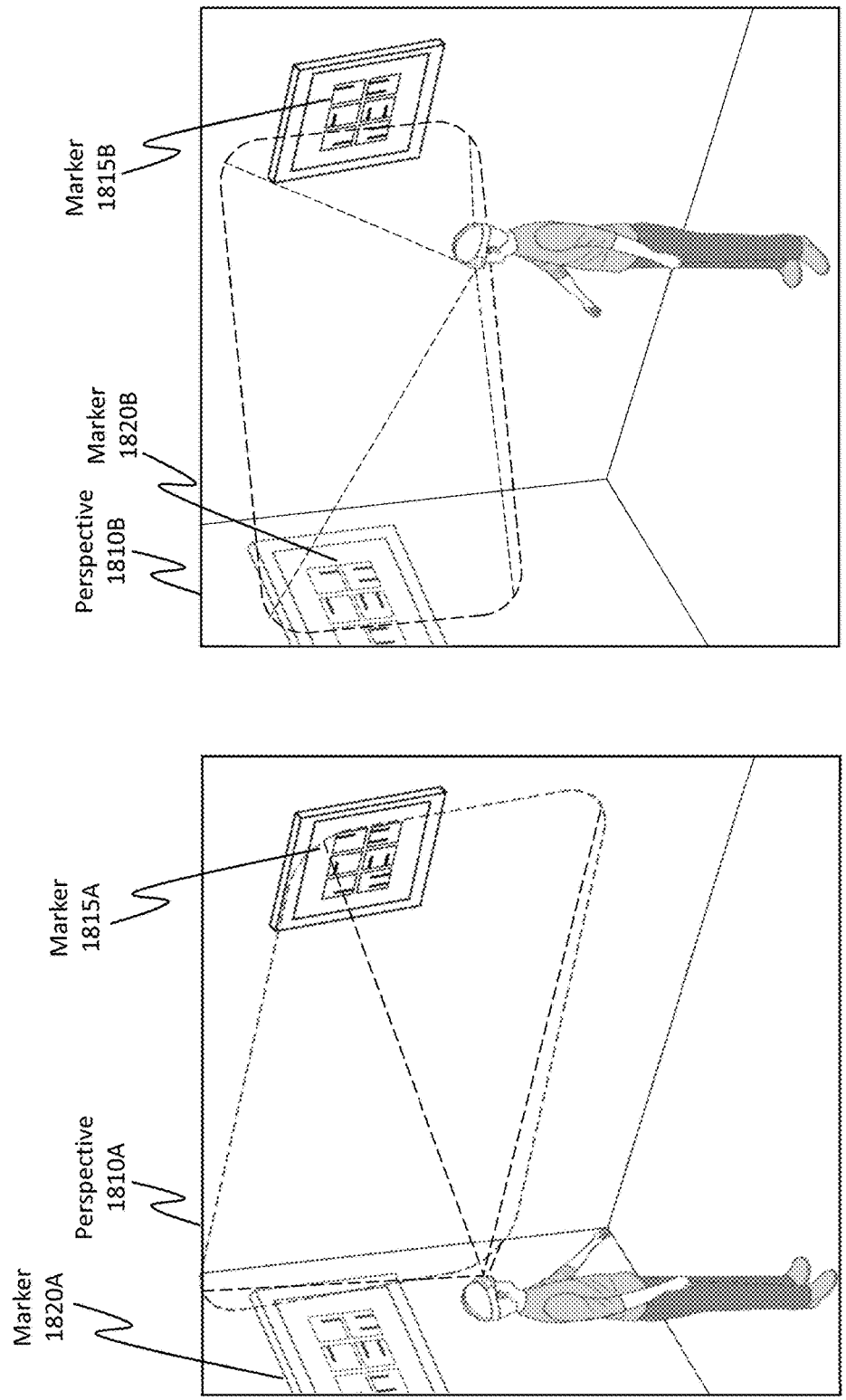

Such a scenario is illustrated in FIG. 18B in which multiple real-world objects are provided to act as the anchor object. To illustrate, perspective 1810A shows an environment that includes a marker 1815A and another marker 1820A. Although calibration markers are shown in FIG. 18B, it will be appreciated that other images, markers, or objects may be used instead.

In perspective 1810A, the user is facing more fully towards marker 1815A. As such, marker 1815A will be used as the anchor object (or calibration object) within the user's VR environment. Later, however, the user has moved positions, as shown in perspective 1810B. Perspective 1810B shows marker 1815B, which corresponds to marker 1815A in perspective 1810A, and marker 1820B, which corresponds to marker 1820A in perspective 1810A. As shown in perspective 1810B, the user has now focused his attention more fully towards marker 1820B. Because of this shift in attention/position, a new anchor object may be displayed within the user's VR environment, where the new anchor object corresponds to marker 1820B as opposed to marker 1815B. From this description, it will be appreciated that any number of different anchor objects may be used. Furthermore, it will be appreciated that in some embodiments, new anchor objects may be selected and displayed in a manner so that at least one anchor object is always displayed within the user's current field of view. That is, as the user moves around such that his field of view changes and as an existing anchor object leaves the user's current field of view, a new anchor object may be selected and brought into the user's field of view. In this manner, the user may always be provided with an anchor object to help the user navigate the real-world environment while interacting with the VR environment. Such features are particularly beneficial for obstacle avoidance.

In some embodiments, a real-world anchor is used in conjunction with a pre-scanned environment. By "pre-scanned environment," it is meant that the HMD is able to use its depth cameras to perform an initial scan of the environment to generate a spatial mapping of that environment. Once the environment is generally known via the mapping operation, then the embodiments may utilize the anchor(s) in the manner described herein. That is, once the mapping of the room is known and once the location of the anchor object(s) is known, the embodiments are able to use one or both of the anchor objects and/or the spatial mapping for obstacle avoidance during virtual reality experiences (i.e. during situations in which the user's view of the real world is entirely cut off).

It will also be appreciated that the disclosed embodiments are able to maintain a database or data store of information detailing currently used and previously used anchor objects. This database may maintain information related to the physical location of those anchor objects (e.g., GPS coordinates, positional relationship relative to other detected objects, etc.). Additionally, the database may include a priority metric, or rather a preference metric, for those anchor objects. As an example, some anchor objects may be higher in quality than other anchor objects, where the quality may be based on any one or combination of the stability of the anchor object (e.g., how likely is it to move), the visibility of the anchor object (e.g., is the object visible only when the user is at a certain location), the reflectivity or detectability of the anchor object (e.g., can the HMD's cameras readily detect the anchor object), the communication abilities of the anchor object (e.g., is the anchor object an electronic device such that the HMD is able to control its output), and so forth. In this regard, the database may store and maintain any type or amount of information for the anchor objects. By storing this information, the embodiments will be able to quickly reference this information, thereby speeding up the VR environment's configuration. Additionally, when multiple anchor objects are available for selection, some embodiments may compare, contrast, or otherwise weight one anchor object above another based on the above-recited priority rankings. In this case, the embodiments may select the anchor object with the highest priority and display only a single anchor object in the VR environment. In other embodiments, however, multiple anchor objects may be selected (e.g., the two top ranked anchor objects, or the three top ranked, and so on).

It will be appreciated that any real-world object can be used as the anchor object. For example, with reference to FIG. 18B, instead of the markers 1820A and/or 1820B, the TV frame or picture frame itself can be used as the anchor object. In some instances, the physical dimensions of the tv or picture frame can be used such as, for example, the spacing between the border areas of the tv or picture frame or even its placement location on the wall. In this regard, any physical attribute or dimension can be used as the anchor object or any displayed image can be used as the anchor object.

Accordingly, the disclosed embodiments are able to select a real-world anchor object and then render a corresponding virtual anchor object within a VR environment. By so doing, the embodiments are able to help a user remain cognizant of his/her real-world environment even when the user is unable to actually see the real-world environment.

Related Embodiments

Figure 19:
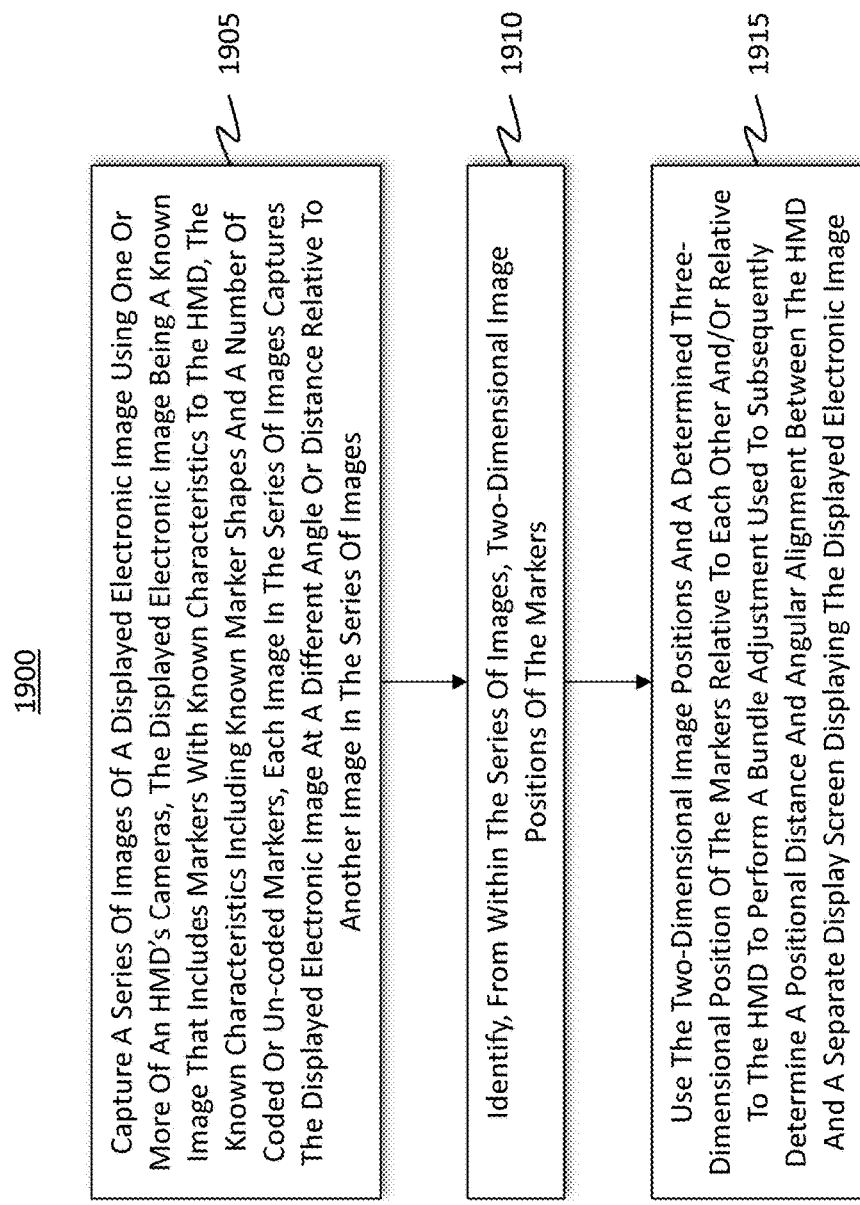
FIG. 19 shows a flowchart of an example method for performing intrinsic and/or extrinsic calibration using a HMD's camera system.

FIG. 19 shows a related embodiment for calibrating the HMD using an electronic image displayed on a display screen. In particular, FIG. 19 shows a flowchart of an example method 1900 for causing a HMD to perform intrinsic (e.g., determining the camera's optical center and focal length) and/or extrinsic (e.g., determining the camera's location relative to the three-dimensional environment) calibration of a camera system of the HMD, which camera system includes one or more cameras, by exploiting a displayed electronic image that is being rendered on a display screen of a separate computer system.

Method 1900 initially includes an act (1905) of capturing a series of images of the displayed electronic image using one or more of the HMD's cameras. This displayed electronic image is a known image that includes markers (e.g., markers 1400A, 1400B, 1400C, 1400D, 1400E, or 1400F from FIG. 14) with known characteristics (e.g., distance 1405, 1410, 1415, 1420, line widths, etc.). As an example, the known characteristics may include known marker shapes (e.g., rectangles, squares, circles, or any other shape) and a number of coded or un-coded markers. An example of a coded marker may be a QR code, a bar code, or any other type of coded image. Un-coded markers may be markers that have no specific meaning. Each image in the series of images captures the displayed electronic image at a different angle or distance relative to another image in the series.

In some embodiments, the known characteristics of the markers include a known distance between any pair of points in the known image. In some embodiments, the known characteristics include known line thicknesses, line boldness, line widths, and/or line heights. In some embodiments, a distance between any pair of points in the image is calculated using a characteristic associated with the dimensions of a model of the display screen of the separate computer system. That is, different models may visualize the displayed electronic image in different manners. By knowing the model beforehand, the HMD can perform compensations or other rectifications to better determine the visualized characteristics of the displayed electronic image.

Method 1900 also includes act 1910 in which two-dimensional image positions of the markers are identified from within the series of images. For instance, with reference to FIGS. 16A, 16B, and 16C, perspective 1600A may be captured by one image in the series, perspective 1600B may be captured by another image in the series, and perspective 1600C may be captured by yet another image in the series. As shown, each of these images captured the displayed markers at a different angle. Using these images, the HMD is able to determine the two-dimensional positions of the markers (e.g., by identifying the distances 1605A, 1605B, and 1605C) in order to determine the positional relationship.

Subsequently, method 1900 includes act 1915 in which the HMD uses the two-dimensional image positions and a determined three-dimensional position of the markers relative to each other and/or relative to the environment/HMD to perform a bundle adjustment for determining a positional distance and angular alignment between the HMD and the separate display screen. This bundle adjustment can be used to determine intrinsic and/or extrinsic camera parameters. By way of introduction, camera parameters often include extrinsic, intrinsic, and/or distortion coefficients. To properly determine/estimate camera parameters, it is beneficial to have three-dimensional points of an object (e.g., the displayed electronic image) and that object's corresponding two-dimensional image points. In some embodiments, the intrinsic parameters are representative of the camera's optical center and focal length. The intrinsic parameters may additionally include a skew coefficient. The extrinsic parameters are representative of the location of the camera relative to the three-dimensional environment. Additionally, these extrinsic parameters include translation and rotation of the camera's image plane. By determining these parameters, the embodiments are able to compensate for different radial distortions, such as, but not limited to, negative radial distortions (e.g., a pincushion effect) and a positive radial distortion (e.g., a barrel effect). Other compensations may include compensations for tangential distortion in which the camera's lens is not parallel to the image plane.

In one example, when the HMD includes only a single camera, a result of the bundle adjustment includes (1) intrinsic camera calibration parameters and (2) the three-dimensional position of the display screen. In another example, when the HMD includes multiple cameras, a result of the bundle adjustment includes (1) intrinsic calibration parameters of each camera included in the multiple cameras, (2) extrinsic calibration parameters which include position and orientation of each camera included in the multiple cameras relative to each other, and (3) a particular position and a particular orientation of the display screen with reference to a three-dimensional coordinate system.

In some embodiments, a re-calibration process may also be performed, either periodically or in response to a determination that the HMD's original or previous calibration has drifted. This re-calibration process may be performed by redoing any of the above processes. Furthermore, to initiate the re-calibration process, the user's movement may be guided so that HMD is brought sufficiently near the display screen of the separate computer system. In some instances, the user movement may be guided by displaying an instruction on a display of the HMD and/or by projecting an audio instruction through one or more speakers of the HMD.

Example Computer System(s)

Figure 20:
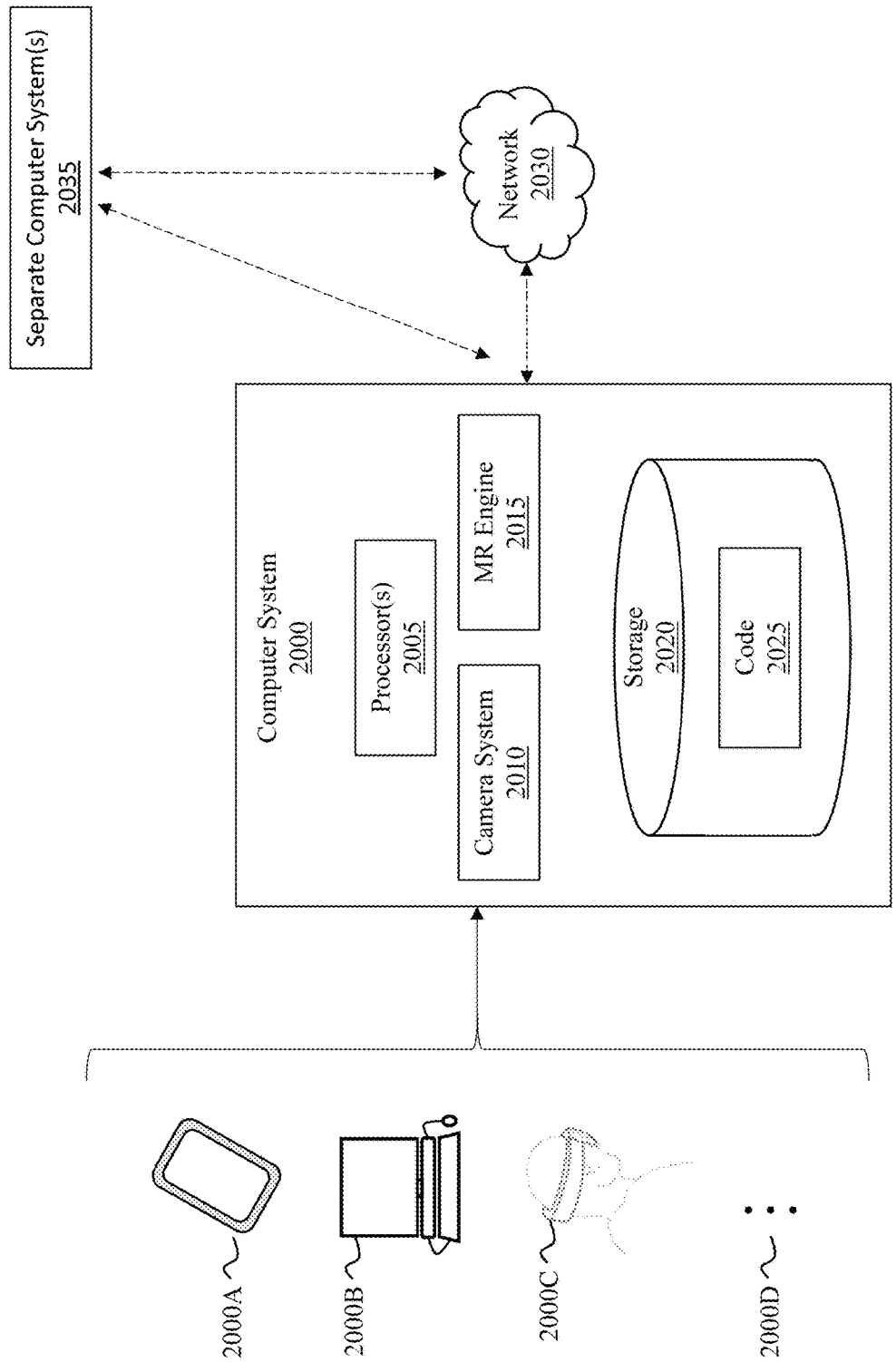
FIG. 20 illustrates an example computer system specially configured to perform any of the disclosed operations.

Attention will now be directed to FIG. 20 which illustrates an example computer system 2000 that may be used to facilitate the operations described herein. In particular, this computer system 2000 may be in the form of the HMDs that were described earlier.

In fact, computer system 2000 may take various different forms. For example, in FIG. 20, computer system 2000 may be embodied as a tablet 2000A, a desktop 2000B, or a HMD 2000C. The ellipsis 2000D demonstrates that computer system 2000 may be embodied in any form. Indeed, computer system 2000 may also be a distributed system that includes one or more connected computing components/devices that are in communication with computer system 2000, a laptop computer, a mobile phone, a server, a data center, and/or any other computer system. The ellipsis 2000D also indicates that other system subcomponents may be included or attached with the computer system 2000, including, for example, sensors that are configured to detect sensor data such as user attributes (e.g., heart rate sensors), as well as sensors like cameras and other sensors that are configured to detect sensor data such as environmental conditions and location/positioning (e.g., clocks, pressure sensors, temperature sensors, gyroscopes, accelerometers and so forth), all of which sensor data may comprise different types of information used during application of the disclosed embodiments.

In its most basic configuration, computer system 2000 includes various different components. For example, FIG. 20 shows that computer system 2000 includes at least one processor 2005 (aka a "hardware processing unit"), a camera system 2010, a mixed-reality (MNR) engine 2015 (e.g., to generate the VR environment), and storage 2020.

Computer system 2000 may also include a depth engine which includes any type of 3D sensing hardware to scan and generate a spatial mapping of an environment. For instance, the depth engine may include any number of time of flight cameras, stereoscopic cameras (e.g., a pair of stereo cameras), and/or one or more depth cameras. Using these cameras, the depth engine is able to capture images of an environment and generate a 3D representation of that environment. Accordingly, depth engine includes any hardware and/or software components necessary to generate a spatial mapping (which may include depth maps, 3D dot/point clouds, and/or 3D meshes). This spatial mapping may be used when segmenting and characterizing the objects in the real-world environment, as described earlier.

Storage 2020 is shown as including executable code/instructions 2025. Storage 2020 may be physical system memory, which may be volatile, non-volatile, or some combination of the two. The term "memory" may also be used herein to refer to non-volatile mass storage such as physical storage media. If computer system 2000 is distributed, the processing, memory, and/or storage capability may be distributed as well. As used herein, the term "executable module," "executable component," or even "component" can refer to software objects, routines, or methods that may be executed on computer system 2000. The different components, modules, engines, and services described herein may be implemented as objects or processors that execute on computer system 2000 (e.g. as separate threads).

The disclosed embodiments may comprise or utilize a special-purpose or general-purpose computer including computer hardware, such as, for example, one or more processors (such as processor 2005) and system memory (such as storage 2020), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are physical computer storage media. Computer-readable media that carry computer-executable instructions are transmission media. Thus, by way of example and not limitation, the current embodiments can comprise at least two distinctly different kinds of computer-readable media: computer storage media and transmission media.

Computer storage media are hardware storage devices, such as RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 2000 may also be connected (via a wired or wireless connection) to external sensors (e.g., one or more remote cameras, accelerometers, gyroscopes, acoustic sensors, magnetometers, etc.). Further, computer system 2000 may also be connected through one or more wired or wireless networks 2030 to remote/separate computer systems(s) 2035 that are configured to perform any of the processing described with regard to computer system 2000. Additionally, the separate computer system(s) 2035 may be the separate computer systems that were discussed earlier (e.g., the smart TV, mobile phone, gaming console, etc.).

During use, a user of computer system 2000 is able to perceive information (e.g., a MR environment (including VR or AR)) through a display screen that is included with the input/output ("I/O") of computer system 2000 and that is visible to the user. The I/O interface(s) and sensors with the I/O also include gesture detection devices, eye trackers, and/or other movement detecting components (e.g., cameras, gyroscopes, accelerometers, magnetometers, acoustic sensors, global positioning systems ("GPS"), etc.) that are able to detect positioning and movement of one or more real-world objects, such as a user's hand, a stylus, and/or any other object(s) that the user may interact with while being immersed in the VR environment.

A graphics rendering engine may also be configured, with processor 2005, to render one or more virtual objects within a VR environment. As a result, the virtual objects accurately move in response to a movement of the user and/or in response to user input as the user interacts within the virtual scene.

A "network," like the network 2030 shown in FIG. 20, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 2000 will include one or more communication channels that are used to communicate with the network 2030. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

Additionally, or alternatively, the functionality described herein can be performed, at least in part, by one or more hardware logic components (e.g., the processor 2005). For example, and without limitation, illustrative types of hardware logic components that can be used include Field-Programmable Gate Arrays (FPGAs), Program-Specific or Application-Specific Integrated Circuits (ASICs), Program-Specific Standard Products (ASSPs), System-On-A-Chip Systems (SOCs), Complex Programmable Logic Devices (CPLDs), Central Processing Units (CPUs), and other types of programmable hardware.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for performing intrinsic and/or extrinsic calibration of a camera system comprising one or more cameras used on a head-mounted device (HMD) that exploits a displayed electronic image that is being rendered on a display screen of a separate computer system, the method comprising:
    capturing a series of images of the displayed electronic image using one or more of the HMD's cameras, wherein the displayed electronic image is a known image that includes markers with known characteristics to the HMD, the known characteristics of the markers including known marker shapes and a number of coded or un-coded markers, and wherein each image in the series of images captures the displayed electronic image at a different angle or distance relative to another image in the series of images;
    identifying, from within the series of images, two-dimensional image positions of the markers; and
    using the two-dimensional image positions and a determined three-dimensional position of the markers relative to each other and/or relative to the HMD to perform a bundle adjustment used to subsequently determine a positional distance and angular alignment between the HMD and the display screen.

2. The method of claim 1, wherein the displayed electronic image is one of a plurality of displayed images, each one of the plurality of displayed images being displayed on a corresponding separate display screen.

3. The method of claim 2, wherein a database is maintained and records position information for each one of the corresponding separate display screens.

4. The method of claim 1, wherein, in a case in which the HMD includes only a single camera, a result of the bundle adjustment includes (1) intrinsic camera calibration parameters and (2) the three-dimensional position of the display screen.

5. The method of claim 1, wherein, in a case in which the HMD includes multiple cameras, a result of the bundle adjustment includes (1) intrinsic calibration parameters of each camera included in the multiple cameras, (2) extrinsic calibration parameters which include position and orientation of each camera included in the multiple cameras relative to each other, and (3) a particular position and a particular orientation of the display screen with reference to a three-dimensional coordinate system.

6. The method of claim 1, wherein the known characteristics of the markers include a known distance between any pair of points in the known image, a line thickness, a line boldness, a line width, and a line height of lines included within the known image.

7. The method of claim 1, wherein the displayed electronic image is a buffered video recording.

8. The method of claim 1, wherein the HMD periodically re-calibrates by periodically causing the displayed electronic image to be re-displayed and by periodically capturing one or more updated HMD images.

9. The method of claim 1, wherein the series of images are burst images used to capture the displayed electronic image.

10. A head-mounted device (HMD) comprising:
    a camera system comprising one or more cameras;
    one or more processors; and
    one or more computer-readable hardware storage devices having stored thereon computer-executable instructions that are executable by the one or more processors to cause the HMD to perform intrinsic and/or extrinsic calibration of the camera system by exploiting a displayed electronic image that is being rendered on a display screen of a separate computer system by causing the HMD to:

capture a series of images of the displayed electronic image using one or more of the HMD's cameras, wherein the displayed electronic image is a known image that includes markers with known characteristics to the HMD, the known characteristics of the markers including known marker shapes and a number of coded or un-coded markers, and wherein each image in the series of images captures the displayed electronic image at a different angle or distance relative to another image in the series of images;

identify, from within the series of images, two-dimensional image positions of the markers; and use the two-dimensional image positions and a determined three-dimensional position of the markers relative to each other and/or relative to the HMD to perform a bundle adjustment used to subsequently determine a positional distance and angular alignment between the HMD and the display screen.

11. The HMD of claim 10, wherein the displayed electronic image is one of a plurality of displayed images, each one of the plurality of displayed images being displayed on a corresponding separate display screen.

12. The HMD of claim 11, wherein a database is maintained and records position information for each one of the corresponding separate display screens.

13. The HMD of claim 10, wherein execution of the computer-executable instructions further causes the HMD to communicate with an internet of things device located within a same environment as the display screen to adjust a brightness of light within the environment, and wherein adjusting the brightness of light includes one or more of adjusting blinds in the environment or altering a dimness of an overhead light.

14. The HMD of claim 10, wherein determining the angular alignment is performed by determining an angular displacement between a central area of the displayed electronic image as rendered on the display screen and an optical axis of at least one camera of the HMD.

15. The HMD of claim 10, wherein the known characteristics of the markers include a known distance between any pair of points in the known image, a line thickness, a line boldness, a line width, and a line height of lines included within the known image.

16. The HMD of claim 10, wherein a particular distance between any pair of points in the image is calculated using a characteristic associated with dimensions of a model of the display screen of the separate computer system.

17. The HMD of claim 10, wherein a re-calibration process is performed in which user movement is guided using a displayed instruction on a display of the HMD and/or an audio instruction provided via speakers of the HMD.

18. The HMD of claim 10, wherein the series of images are burst images used to capture the displayed electronic image.

19. One or more hardware storage devices having stored thereon computer-executable instructions that are executable by one or more processors of head-mounted device (HMD) to cause the HMD to perform intrinsic and/or extrinsic calibration of a camera system of the HMD, which camera system includes one or more cameras, by exploiting a displayed electronic image that is being rendered on a display screen of a separate computer system by causing the HMD to:

capture a series of images of the displayed electronic image using one or more of the HMD's cameras, wherein the displayed electronic image is a known image that includes markers with known characteristics to the HMD, the known characteristics of the markers including known marker shapes and a number of coded or un-coded markers, and wherein each image in the series of images captures the displayed electronic image at a different angle or distance relative to another image in the series of images;

identify, from within the series of images, two-dimensional image positions of the markers; and use the two-dimensional image positions and a determined three-dimensional position of the markers relative to each other and/or relative to the HMD to perform a bundle adjustment used to subsequently determine a positional distance and angular alignment between the HMD and the display screen.

20. The one or more hardware storage devices of claim 19, wherein the displayed electronic image is one of a plurality of displayed images, each one of the plurality of displayed images being displayed on a corresponding separate display screen.

* * * * *